US012659241B2

(12) United States Patent
Coudert et al.

(10) Patent No.: US 12,659,241 B2
(45) Date of Patent: Jun. 16, 2026

---

(54) KEY PERFORMANCE INDICATOR (KPI) ANONYMIZATION FOR MACHINE LEARNING TRAINING IN WIRELESS COMMUNICATION NETWORKS

(71) Applicant: T-MOBILE INNOVATIONS LLC, Overland Park, KS (US)

(72) Inventors: Oliver Coudert, Arlington, VA (US); Durga Prasad Satapathy, Ashburn, VA (US); Javed Rahman, Leesburg, VA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 105 days.

(21) Appl. No.: 18/495,032

(22) Filed: Oct. 26, 2023

(65) Prior Publication Data

US 2025/0141760 A1     May 1, 2025

(51) Int. Cl.
*H04L 41/5009* (2022.01)
*H04L 41/16* (2022.01)

(52) U.S. Cl.
CPC .......... *H04L 41/5009* (2013.01); *H04L 41/16* (2013.01)

(58) Field of Classification Search
CPC ............................ H04L 41/5009; H04L 41/16
See application file for complete search history.

(56) References Cited

U.S. PATENT DOCUMENTS 10,097,434 B2 * 10/2018 Shelton .................. H04L 43/12
10,230,597 B2    3/2019 Parandehgheibi et al.

11,403,332 B2    8/2022 Jayaraman et al.
11,503,002 B2   11/2022 Goel
11,574,186 B2    2/2023 Tyoob et al.
11,615,208 B2    3/2023 Truong et al.
2016/0294640 A1* 10/2016 Da Silva ............. H04L 47/6215

(Continued)

FOREIGN PATENT DOCUMENTS

WO   WO-2021139253 A1 *  7/2021   .......... G06F 11/3051
WO   WO-2024018257 A1 *  1/2024   ......... H04L 41/0823

OTHER PUBLICATIONS

Fredrikson, et al.; "Model Inversion Attacks that Exploit Confidence Information and Basic Countermeasures"; Proceedings of the 22nd ACM SIGSAC Conference on Computer and Communications Security; 2015; 12 pages.

*Primary Examiner* — Joe Chacko

(57)            ABSTRACT

Various embodiments comprise a wireless communication network configured to anonymize network Key Performance Indicators (KPIs) to train a machine learning model. In some examples, the wireless communication network comprises a network analytics system and a KPI store. The network analytics system retrieves the network KPIs generated by network KPI sources. The analytics system filters the network KPIs based on an intended function of the machine learning model. The analytics system identifies correlated ones of the filtered KPIs and groups the correlated ones of the filtered KPIs into KPI groups based on a network condition. For each KPI group, the analytics system sorts the filtered KPIs into KPI ranges. For each KPI range, the analytics system tokenizes the KPI range by converting the filtered KPIs that compose the KPI range into strings. The KPI store stores the tokenized KPIs in a KPI database accessible by the machine learning model for training.

20 Claims, 12 Drawing Sheets

(56)  References Cited

U.S. PATENT DOCUMENTS

| | | | |
|---|---|---|---|
| 2019/0278688 A1* | 9/2019 | Alsheich | G06F 11/3024 |
| 2020/0394534 A1* | 12/2020 | Krishnan | G06F 17/15 |
| 2021/0092026 A1* | 3/2021 | Di Pietro | G06N 20/00 |
| 2021/0279632 A1* | 9/2021 | Di Pietro | H04L 41/14 |
| 2022/0022076 A1* | 1/2022 | Saluja | G06N 20/00 |
| 2022/0188700 A1* | 6/2022 | Khavronin | G06Q 30/0201 |
| 2022/0360513 A1* | 11/2022 | Matham | H04L 43/08 |
| 2023/0010019 A1* | 1/2023 | Muthuswamy | G06Q 10/06393 |
| 2023/0048092 A1* | 2/2023 | White | H04L 63/0807 |
| 2023/0259705 A1 | 8/2023 | Tunstall-Pedoe et al. | |
| 2024/0348663 A1* | 10/2024 | Crabtree | H04L 63/104 |

* cited by examiner

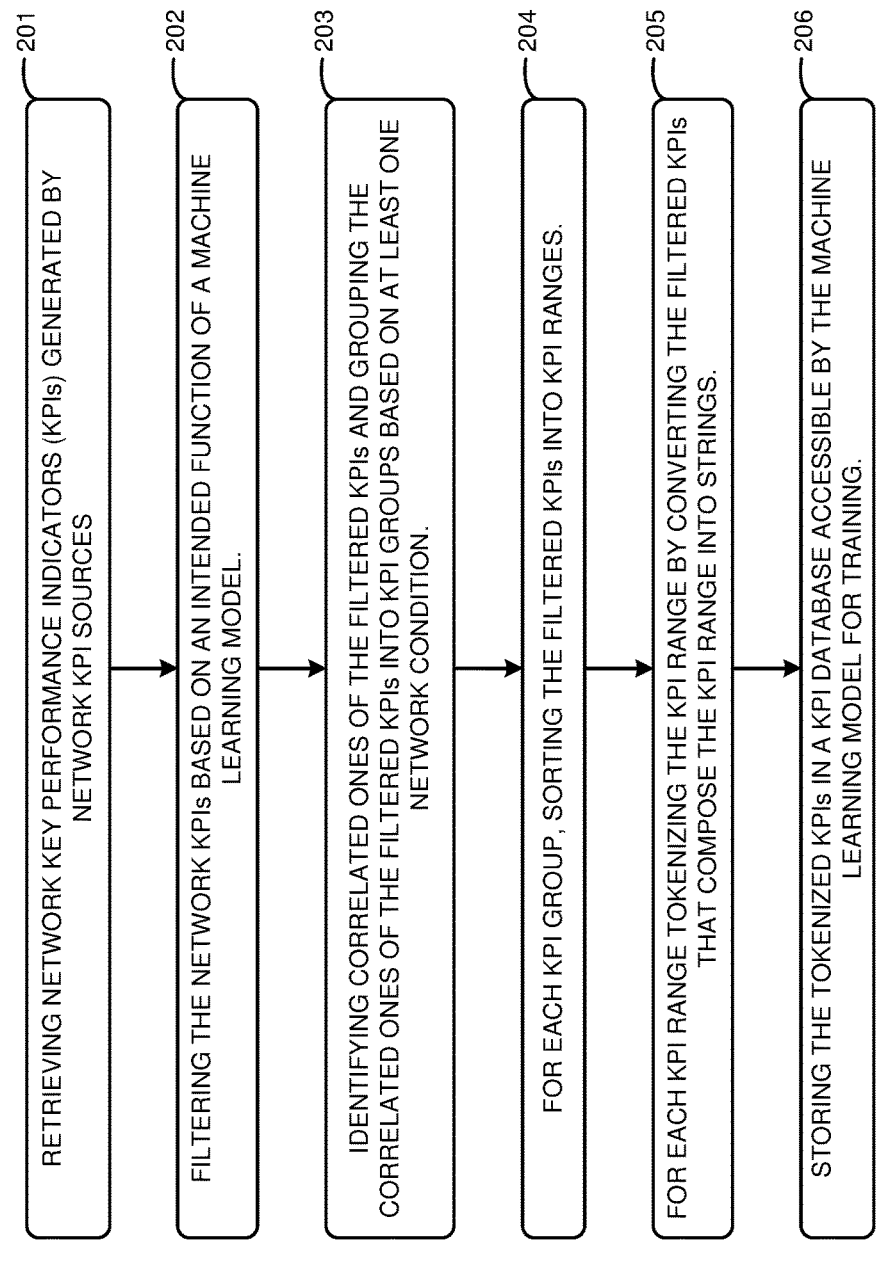

201 — RETRIEVING NETWORK KEY PERFORMANCE INDICATORS (KPIs) GENERATED BY NETWORK KPI SOURCES

202 — FILTERING THE NETWORK KPIs BASED ON AN INTENDED FUNCTION OF A MACHINE LEARNING MODEL.

203 — IDENTIFYING CORRELATED ONES OF THE FILTERED KPIs AND GROUPING THE CORRELATED ONES OF THE FILTERED KPIs INTO KPI GROUPS BASED ON AT LEAST ONE NETWORK CONDITION.

204 — FOR EACH KPI GROUP, SORTING THE FILTERED KPIs INTO KPI RANGES.

205 — FOR EACH KPI RANGE TOKENIZING THE KPI RANGE BY CONVERTING THE FILTERED KPIs THAT COMPOSE THE KPI RANGE INTO STRINGS.

206 — STORING THE TOKENIZED KPIs IN A KPI DATABASE ACCESSIBLE BY THE MACHINE LEARNING MODEL FOR TRAINING.

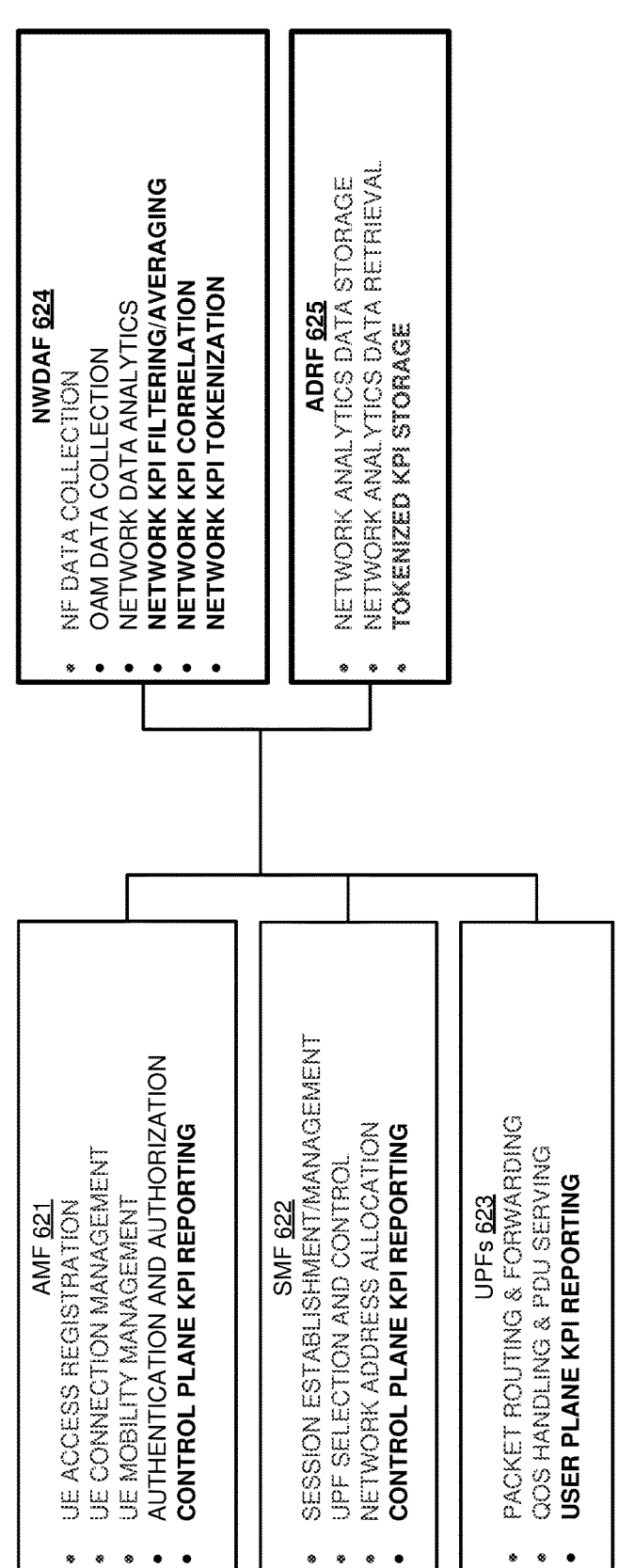

NWDAF 624
* NF DATA COLLECTION
* OAM DATA COLLECTION
* NETWORK DATA ANALYTICS
* NETWORK KPI FILTERING/AVERAGING
* NETWORK KPI CORRELATION
* NETWORK KPI TOKENIZATION

ADRF 625
* NETWORK ANALYTICS DATA STORAGE
* NETWORK ANALYTICS DATA RETRIEVAL
* TOKENIZED KPI STORAGE

AMF 621
* UE ACCESS REGISTRATION
* UE CONNECTION MANAGEMENT
* UE MOBILITY MANAGEMENT
* AUTHENTICATION AND AUTHORIZATION
* CONTROL PLANE KPI REPORTING

SMF 622
* SESSION ESTABLISHMENT/MANAGEMENT
* UPF SELECTION AND CONTROL
* NETWORK ADDRESS ALLOCATION
* CONTROL PLANE KPI REPORTING

UPFs 623
* PACKET ROUTING & FORWARDING
* QOS HANDLING & PDU SERVING
* USER PLANE KPI REPORTING

KEY PERFORMANCE INDICATOR (KPI) ANONYMIZATION FOR MACHINE LEARNING TRAINING IN WIRELESS COMMUNICATION NETWORKS

BACKGROUND

Wireless communication networks provide wireless data services to wireless user devices. Exemplary wireless data services include machine-control, internet-access, media-streaming, online gaming, and social-networking. Exemplary wireless user devices comprise phones, computers, vehicles, robots, and sensors. Radio Access Networks (RANs) exchange wireless signals with the wireless user devices over radio frequency bands. The wireless signals use wireless network protocols like Fifth Generation New Radio (5GNR), Long Term Evolution (LTE), Institute of Electrical and Electronic Engineers (IEEE) 802.11 (WIFI), and Low-Power Wide Area Network (LP-WAN). The RANs exchange network signaling and user data with network elements that are often clustered together into wireless network cores over backhaul data links. The core networks execute network functions to provide wireless data services to the wireless user devices.

Machine learning algorithms are designed to recognize patterns and automatically improve through training and the use of data. Examples of machine learning algorithms include artificial neural networks, nearest neighbor methods, gradient-boosted trees, ensemble random forests, support vector machines, naïve Bayes methods, and linear regressions. Some machine learning models comprise supervised learning models. A supervised machine learning algorithm comprises an input layer and an output layer, wherein complex analyzation takes places between the two layers. Various training methods are used to train machine learning algorithms wherein an algorithm is continually updated and optimized until a satisfactory model is achieved. One advantage of supervised learning machine learning algorithms is their ability to learn by example, rather than needing to be manually programmed to perform a task, especially when the tasks would require a near-impossible amount of programming to perform the operations in which they are used.

Wireless communication networks utilize machine learning algorithms to predict network conditions, provide recommendations to network operators, drive innovation, and perform other machine learning assisted tasks. For the models to be effective, they must be trained using large amounts of network data that depicts network performance, fault management responses, and network configurations. Once trained the models can anticipate network needs to autonomously adapt operation, or even identify new features for existing systems that may enhance system performance while reducing operational expenses.

Wireless communication networks are reluctant to share data that exposes their network performance, fault management responses, and network configurations. This reluctance silos usable data within the network thereby increasing the difficulty of training machine learning systems. For example, third party entities that wish to generate their own machine learning tools for wireless communication networks may not have access to the data needed to train the models. Unfortunately, wireless communication networks do not effectively provide data to train machine learning models. Moreover, the wireless communication networks do not efficiently anonymize network data for training machine learning systems.

Overview

This Overview is provided to introduce a selection of concepts in a simplified form that are further described below in the Technical Description. This summary is not intended to identify key features or essential features of the claimed subject matter, nor is it intended to be used as an aid in determining the scope of the claimed subject matter.

Various embodiments of the present technology relate to solutions for network analytics and machine learning in a wireless communication network. Some embodiments comprise a method of operating a wireless communication network to anonymize network Key Performance Indicators (KPIs) to train a machine learning model. The method comprises retrieving the network KPIs generated by network KPI sources. The method further comprises filtering the network KPIs based on an intended function of the machine learning model. The method further comprises identifying correlated ones of the filtered KPIs and grouping the correlated ones of the filtered KPIs into KPI groups based on at least one network condition. The method further comprises, for each KPI group, sorting the filtered KPIs into KPI ranges. The method further comprises, for each KPI range, tokenizing the KPI range by converting filtered KPIs that compose the KPI range into strings. The method further comprises storing the tokenized KPIs in a KPI database accessible by the machine learning model for training.

Some embodiments comprise a wireless communication network configured to anonymize network KPIs to train a machine learning model. The wireless communication network comprises a network analytics system and a KPI store. The network analytics system retrieves the network KPIs generated by network KPI sources. The network analytics system filters the network KPIs based on an intended function of the machine learning model. The network analytics system identifies correlated ones of the filtered KPIs and groups the correlated ones of the filtered KPIs into KPI groups based on at least one network condition. For each KPI group, the network analytics system sorts the filtered KPIs into KPI ranges. For each KPI range, the network analytics system tokenizes the KPI range by converting filtered KPIs that compose the KPI range into strings. The KPI store stores the tokenized KPI in a KPI database accessible by the machine learning model for training.

Some embodiments comprise a wireless communication network configured to anonymize network KPIs to train a machine learning model. The wireless communication network comprises a Network Data Analytics Function (NWDAF) and Analytics Data Repository Function (ADRF). The NWDAF retrieves the network KPIs generated by network KPI sources. The NWDAF filters the network KPIs based on an intended function of the machine learning model. The NWDAF identifies correlated ones of the filtered KPIs and groups the correlated ones of the filtered KPIs into KPI groups based on at least one network condition. For each KPI group, the NWDAF sorts the filtered KPIs into KPI ranges. For each KPI range, the NWDAF tokenizes the KPI range by converting the filtered KPIs that compose the KPI range into strings. The ADRF stores the tokenized KPI in a KPI database accessible by the machine learning model for training.

DESCRIPTION OF THE DRAWINGS

Many aspects of the disclosure can be better understood with reference to the following drawings. The components in the drawings are not necessarily drawn to scale. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

FIG. 2 illustrates an exemplary operation of the wireless communication network to anonymize network KPIs.

FIG. 11 further illustrates the NFVI in the 5G communication networks.

Figure 1:
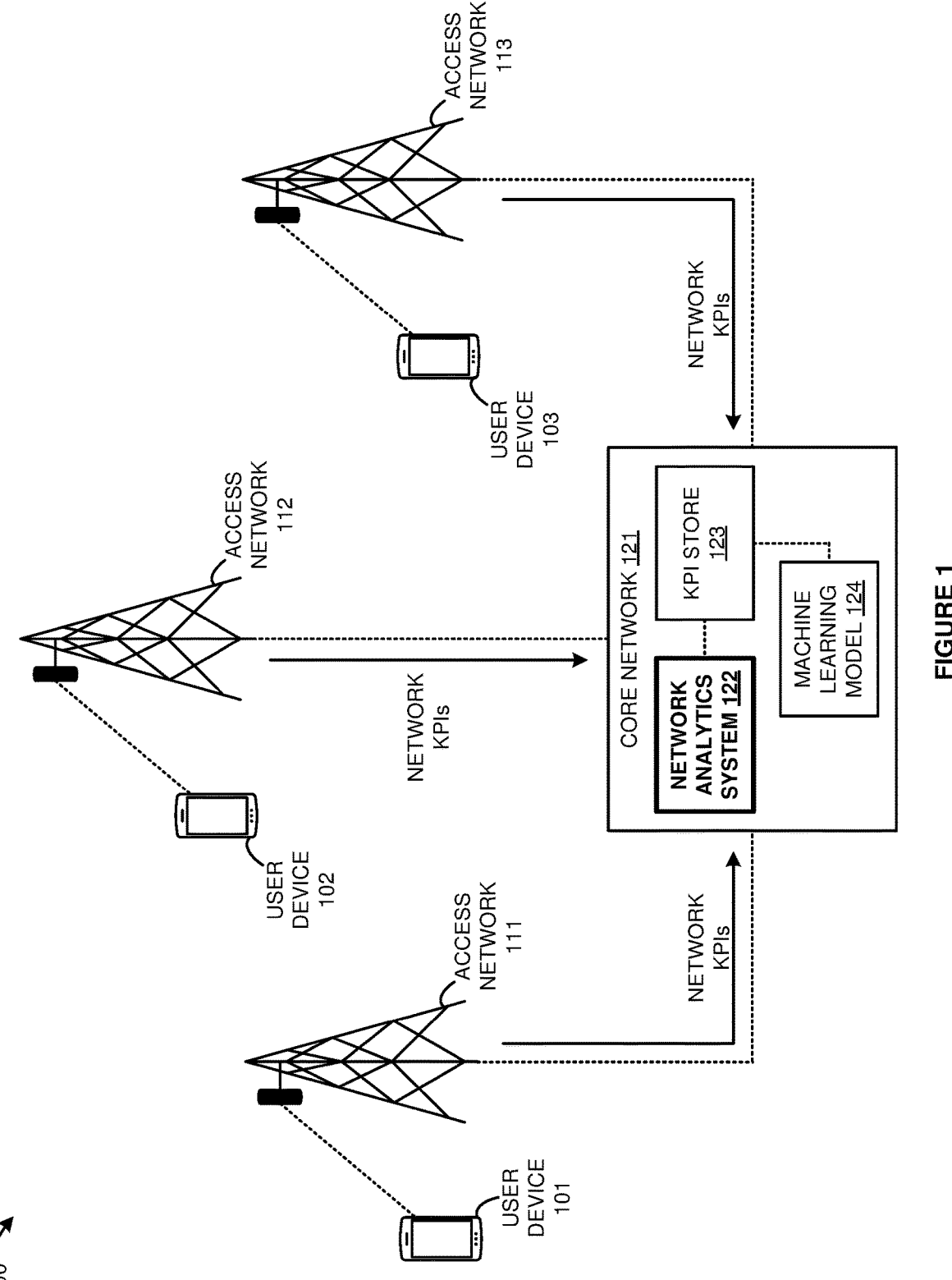
FIG. 1 illustrates a wireless communication network to anonymize network Key Performance Indicators (KPIs).

The drawings have not necessarily been drawn to scale. Similarly, some components or operations may not be separated into different blocks or combined into a single block for the purposes of discussion of some of the embodiments of the present technology. Moreover, while the technology is amendable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

TECHNICAL DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

FIG. 1 illustrates wireless communication network 100 network to anonymize network Key Performance Indicators (KPIs). Wireless communication network 100 delivers services like machine communications, internet-access, media-streaming, or some other wireless communications product. Wireless communication network 100 comprises user devices 101-103, access networks 111-113, and core network 121. Core network 121 comprises analytics system 122, KPI store 123, and machine learning model 124. In other examples, wireless communication network 100 may comprise additional or different elements than those illustrated in FIG. 1.

Various examples of network operation and configuration are described herein. In some examples, access networks 111-113 generate and transfer KPIs to core network 121. The KPIs characterize the operation of access networks 111-113 and the service provided to user devices 101-103. Analytics system 122 retrieves the KPIs generated by access network 111-113 and filters the KPIs based on the functionality of machine learning model 124. For example, machine learning model 124 may be trained to generate synthetic KPIs that realistically represent the operation of network 100 under various operating conditions. Analytics system 122 may filter the KPIs received from networks 111-113 that correspond to the synthetic KPIs output by model 124. Analytics system 122 processes the network KPIs to identify correlations between the KPIs and groups the filtered KPIs based on one or more network conditions. Exemplary network conditions include geographic location, time period, loading conditions, and the like. For each KPI group, analytics system 122 sorts the filtered KPIs into KPI ranges and tokenizes each KPI range by converting filtered KPIs that compose the KPI range into strings. KPI store 123 stores the resulting tokenized KPIs in a database (or other type of memory system) accessible by the machine learning model 124 for training.

Wireless communication network 100 provides wireless data and multimedia services to user devices 101-103. Exemplary user devices include phones, computers, vehicles, robots, and sensors. Access networks 111-113 exchange wireless signals with respective ones of user devices 101-103 over radio frequency bands. The wireless signals use wireless network protocols like Fifth Generation New Radio (5GNR), Long Term Evolution (LTE), Institute of Electrical and Electronic Engineers (IEEE) 802.11 (WIFI), and Low-Power Wide Area Network (LP-WAN). Although access networks 111-113 are illustrated as each serving a single user device, access networks 111-113 typically serve many more devices. Access networks 111-113 are connected to core network 121 over backhaul data links. Access networks 111-113 exchange network signaling and user data with network elements in core network 121. Access networks 111-113 and core network 121 may communicate via edge networks like internet backbone providers, edge computing systems, or another type of edge system to provide the backhaul data links between access networks 111-113 and core network 121.

Access networks 111-113 may comprise Radio Units (RUs), Distributed Units (DUs) and Centralized Units (CUs). The RUs may be mounted at elevation and have antennas, modulators, signal processors, and the like. The RUs are connected to the DUs which are usually nearby network computers. The DUs handle lower wireless network layers like the Physical Layer (PHY), Media Access Control (MAC), and Radio Link Control (RLC). The DUs are connected to the CUs which are larger computer centers that are closer to core network 121. The CUs handle higher wireless network layers like the Radio Resource Control (RRC), Service Data Adaption Protocol (SDAP), and Packet Data Convergence Protocol (PDCP). The CUs are coupled to network functions core network 121.

Core network 121 is representative of computing systems that provide wireless data and multimedia services to user devices 101-103. Exemplary computing systems comprise data centers, server farms, Network Function Virtualization Infrastructure (NFVI), cloud computing networks, hybrid cloud networks, and the like. The computing systems of core network 121 store and execute the network functions to form analytics system 122 and KPI store 123 and to provide the wireless data and multimedia services to user devices 101-103 over access networks 111-113. Exemplary network functions include Access and Mobility Management Function (AMF), Session Management Function (SMF), User Plane Function (UPF), Network Data Analytics Function (NWDAF), and Analytics Data Repository Function (ADRF). Core network 121 may comprise a Fifth Generation Core (5GC) architecture, an Evolved Packet Core (EPC) architecture, and the like.

FIG. 2 illustrates process 200. Process 200 comprises an exemplary operation of wireless communication network 100 to anonymize network KPIs. The operation may vary in other examples. The operations of process 200 comprise retrieving network KPIs generated by network KPI sources (step 201). The operations further comprise filtering the network KPIs based on an intended function of a machine learning model (step 202). The operations further comprise identifying correlated ones of the filtered KPIs and grouping the correlated ones of the filtered KPIs into KPI groups based on at least one network condition (step 203). The operations further comprise, for each KPI group, sorting the filtered KPIs into KPI ranges (step 204). The operations further comprise, for each KPI range, tokenizing the KPI range by converting the filtered KPIs that compose the KPI range into strings (step 205). The operations further comprise storing the tokenized KPIs in a KPI database accessible by the machine learning model for training (step 206).

Figure 3:
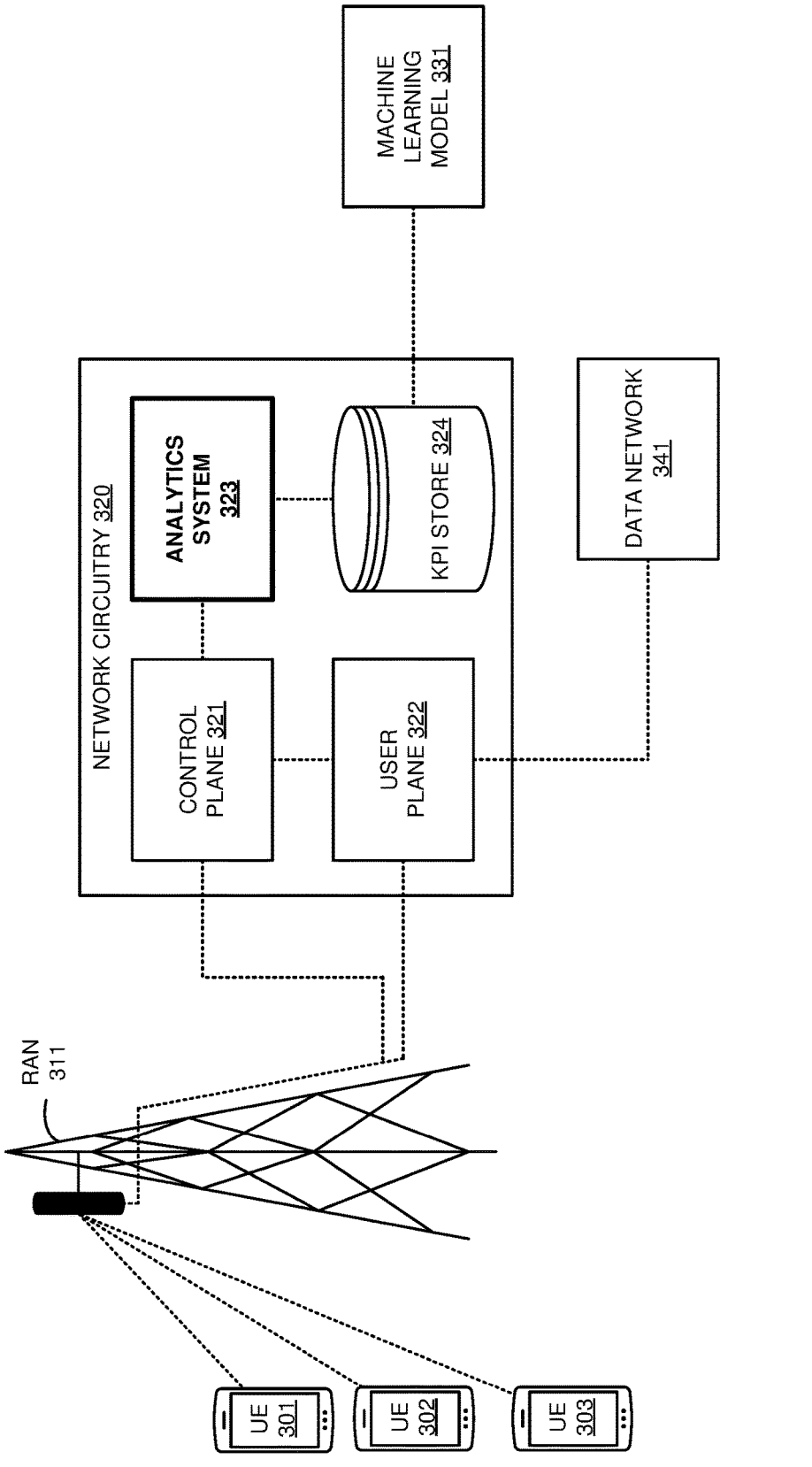
FIG. 3 illustrates a wireless communication network to anonymize network KPIs for machine learning training.

FIG. 3 illustrates wireless communication network 300 network to anonymize network KPIs for machine learning training. Wireless communication network 300 is an example of communication network 100, however network 100 may differ. Wireless communication network 300 comprises User Equipment (UEs) 301-303, RAN 311, network circuitry 320, machine learning model 331, and data network 341. Network circuitry 320 comprises control plane 321, user plane 322, analytics system 323, and KPI store 324. In other examples, wireless communication network 300 may comprise additional or different elements than those illustrated in FIG. 3.

In some examples, UEs 301-303 attach to RAN 311 and exchange signaling with control plane 321 to receive data services over RAN 311. Control plane 321 interfaces with user plane 322 to organize and provide the requested data services. Once setup, UEs 301-303 exchange user data with user plane 322 over RAN 311. User plane 322 exchanges the user data with data network 341. RAN 311, control plane 321, and user plane 322 are subscribed to analytics system 323 for KPI reporting. RAN 311, control plane 321, and user plane 322 generate KPIs that characterize their operation and the service provided to UEs 301-303. RAN 311, control plane 321, and user plane 322 report their respective KPIs to analytics system 323. Exemplary KPIs include downlink traffic volume (in Megabytes), call count, average downlink throughput (in kbps), access failure rate, call drop rate, call drop count, Physical Resource Block (PRB) utilization, Radio Resource Control (RRC) connected users count, packet loss rate, average Received Signal Received Quality (RSRQ), average Received Signal Received Power (RSRP), Random Access Channel (RACH) success rate, average Singal-to-Interference plus Noise Ratio (SINR), and/or other network KPIs. For example, RAN 311 may transfer measurement commands to UEs 301-303. UEs 301 may measure the RSRP and RSRQ for RAN 311 and transfer measurement reports to RAN 311 comprising the measured values. RAN 311 may report the KPIs for RSRP and RSRQ to analytics system 323. It should be appreciated that these KPIs are exemplary and that different or additional KPIs may be used in other examples.

Analytics system 323 receives the network KPIs generated by RAN 311, control plane 321, and user plane 322. In should be appreciated that since RAN 311, control plane 321, and user plane 322 are different network elements, the KPIs that they report may differ. For example, RAN 311 may report KPIs characterizing radio conditions (e.g., RSRP, RSRQ, SINR, etc.) while control plane 321 may report KPIs characterizing control plane operations (e.g., requested slice types, registration requests, Quality-of-Service (QOS) levels, etc.) Analytics system 323 selects ones of the reported KPIs based on the relevance to the function of machine learning model 331. For example, machine learning model 331 may be trained to predict when heavily loaded network conditions occur in network 300 and analytics system 323 may select network KPIs related to network loading (e.g., registration request rate).

Analytics system 323 determines correlations between the selected KPIs. For example, analytics system 323 may host a data structure that implements correlation algorithm and input the KPIs into the data structure to determine the correlations. Exemplary correlation algorithms include Dynamic Time Warping (DTW), Uniform Manifold Approximation and Projection (UMAP), Fréchet distance, t-Stochastic Neighbor Embedding (t-SNE), Principal Component Analysis (PAC), and the like. Analytics system 323 groups each of the correlated KPIs based on shared network conditions. Exemplary network conditions include RAN configuration (frequency ranges, bandwidth, etc.), the Radio Access Technology Type (RAT) type (e.g., 5GNR, LTE, etc.), network loading, geographic location type (e.g., rural, suburban, urban, etc.), network behavior (e.g., handover rate, fixed users, etc.), a time period (e.g., weekdays, weekends, etc.), and the like. For example, analytics system 323 may group a first set of correlated KPIs that were generated by rural cell sites during lightly loaded network conditions and may group a second set of correlated KPIs that were generated by urban cell sites during heavily loaded network conditions. Analytics system 323 tokenizes the grouped KPIs to anonymize the network KPI data by converting the numeric values of the KPIs into strings. The strings may be any word or phrase but are typically selected to represent a particular network condition. For example, analytics system 323 may replace the numeric values of SINR KPIs that fall below-5 dB with the word "poor". By replacing the numeric values with strings, analytics system 323 prevents network data from being exposed while still conveying realistic network conditions. Analytics system 323 transfers the tokenized KPIs to KPI store 324 which stores the tokens in memory. KPI store 324 may additionally store mappings to convert the strings (e.g., poor) back into their numeric values. KPI store 324 is accessible by machine learning model 331 to trains its constituent machine learning algorithms.

Advantageously, wireless communication network 300 effectively generates network KPIs to train machine learning models. Moreover, wireless communication network 300 efficiently anonymizes the network KPIs for training the machine learning models to inhibit the exposure of network capabilities, network performance, RAN and network function identities, and user information.

UEs 301-303 and RAN 311 communicate over links using wireless/wired technologies like 5GNR, LTE, LP-WAN, WIFI, Bluetooth, and/or some other type of wireless or wireline networking protocol. The wireless technologies use electromagnetic frequencies in the low-band, mid-band, high-band, or some other portion of the electromagnetic spectrum. The wired connections comprise metallic links, glass fibers, and/or some other type of wired interface. RAN 311, control plane 321, user plane 322, analytics system 323, KPI store 324, machine learning model 331, and data network 341 communicate over various links that use metallic links, glass fibers, radio channels, or some other communication media. The links use Fifth Generation Core (5GC), IEEE 802.3 (ENET), Time Division Multiplex (TDM), Data Over Cable System Interface Specification (DOCSIS), Internet Protocol (IP), General Packet Radio Service Transfer Protocol (GTP), 5GNR, LTE, WIFI, virtual switching, inter-processor communication, bus interfaces, and/or some other data communication protocols.

UEs 301-303 comprise phones, vehicles, computers, sensors, drones, robots, or other types of data appliances with wireless and/or wireline communication circuitry. Although RAN 311 is illustrated as a tower, RAN 311 may comprise another type of mounting structure (e.g., buildings), or no mounting structure at all. RAN 311 comprises a Fifth Generation (5G) RAN, LTE RAN, gNodeBs, eNodeBs, NB-IoT access nodes, LP-WAN base stations, wireless relays, WIFI hotspots, Bluetooth access nodes, and/or another wireless or wireline network transceiver. UEs 301-303 and RAN 311 comprise antennas, amplifiers, filters, modulation, analog/digital interfaces, microprocessors, software, memories, transceivers, bus circuitry, and the like. Control plane 321 comprises network functions like AMF, SMF, and the like. User plane 322 comprises network functions like UPF and the like. Analytics system 323 comprises network functions like NWDAF and the like. KPI store 324 comprises network functions like ADRF and the like. Data network 341 comprises elements like Application Server (AS) and the like.

Machine learning model 331 comprises any machine learning model implemented within network 300 to generate synthetic KPI streams, predict network conditions, and/or perform some other type of machine learning assisted task. A machine learning model comprises one or more machine learning algorithms that are trained based on historical data and/or other types of training data. A machine learning model may employ one or more machine learning algorithms through which data can be analyzed to identify patterns, make decisions, make predictions, or similarly produce output. Examples of machine learning algorithms that may be employed solely or in conjunction with one another include Large Language Models (LLMs), Three Dimensional (3D) deep leaning models, 3D convolutional neural networks, times series convolutional deep learning, transformers, multi-layer perceptron, long term short memory, and attention based deep learning model. Other exemplary machine learning algorithms include artificial neural networks, nearest neighbor methods, ensemble random forests, support vector machines, naïve Bayes methods, linear regressions, or similar machine learning techniques or combinations thereof capable of predicting output based on input data.

UEs 301-303, RAN 311, control plane 321, user plane 322, analytics system 323, KPI store 324, machine learning model 331, and data network 341 comprise microprocessors, software, memories, transceivers, bus circuitry, and the like. The microprocessors comprise Digital Signal Processors (DSP), Central Processing Units (CPU), Graphical Processing Units (GPU), Application-Specific Integrated Circuits (ASIC), Field Programmable Gate Array (FPGA), and/or the like. The memories comprise Random Access Memory (RAM), flash circuitry, Solid State Drives (SSD), Non-Volatile Memory Express (NVMe) SSDs, Hard Disk Drives (HDDs), and/or the like. The memories store software like operating systems, user applications, radio applications, and network functions. The microprocessors retrieve the software from the memories and execute the software to drive the operation of wireless communication network 300 as described herein.

Figure 4:
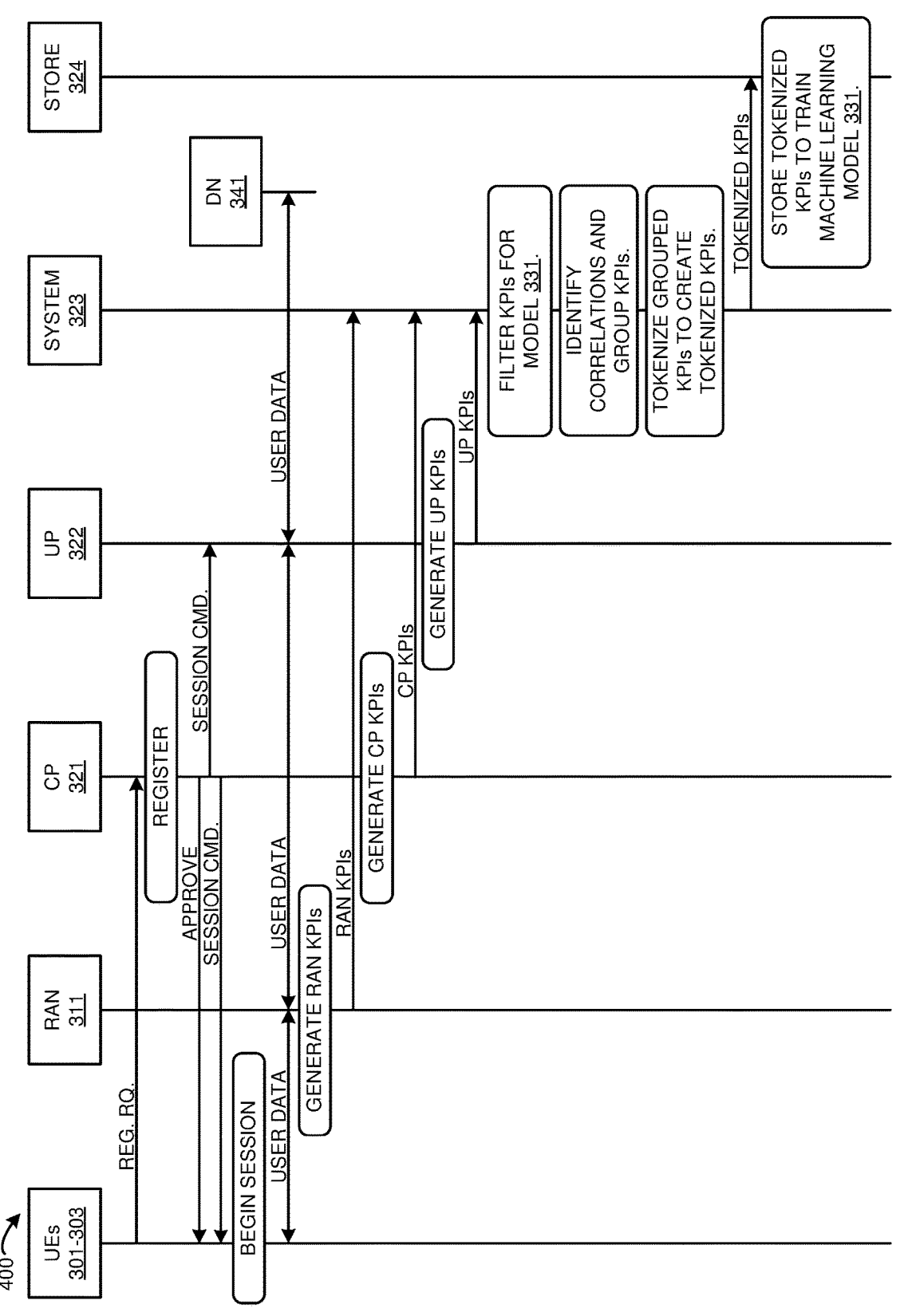
FIG. 4 illustrates an exemplary operation of the wireless communication network to anonymize network KPIs for machine learning training.

FIG. 4 illustrates process 400. Process 400 comprises an exemplary operation of wireless communication network 300 to anonymize network KPIs for machine learning training. Process 400 is an example of process 200 illustrated in FIG. 2, however process 200 may differ. In some examples, UEs 301-303 attach to RAN 311 and transfer registration requests (REG. RQ.) to control plane (CP) 321. The registration requests include information like registration type, UE capabilities, Protocol Data Unit (PDU) session requests, slice requests, device type indications, and the like. Control plane 321 processes the registration requests to authenticate and register UEs 301-303 for wireless data services. Once registered, control plane 321 transfers registration approval messages to UEs 301-303 over RAN 311 and transfers a session command (CMD) that directs user plane (UP) 322 to serve UEs 301. Once user plane 322 is organized, control plane 321 transfers session commands to UEs 301-303 to begin their data sessions. UEs 301-303 begin their respective sessions and exchange user data with user plane 322 over RAN 311. User plane 322 exchanges the network data with data network 341.

As RAN 311 and network circuitry 320 serve UEs 301-303, RAN 311, control plane 321, and user plane 322 generate KPIs that characterize their operations. RAN 311 reports RAN KPIs like PRB utilization, RRC connected users count, average RSRQ, average RSRP, average SINR, Random Access Channel (RACH), downlink traffic volume, call count, average downlink throughput, access failure rate, call drop rate, call drop count, packet loss rate, and the like to analytics system 323. Control plane 321 reports control plane KPIs like authentication success rate, registration request rate, requested slice types, requested PDU sessions, and the like to analytics system 323. User plane 322 transfers user plane KPIs like average bitrate, data throughput, data latency, slice metrics, and the like to analytics system 323.

Analytics system 323 receives and filters the network KPIs based on an intended function of model 331. In this example, the intended function of machine learning model 331 is to generate synthetic KPIs that realistically depict the status of network 300 without exposing actual network data. Analytics system 323 determines the set of synthetic KPIs model 331 is trained to generate and selects corresponding ones of the KPIs reported by RAN 311, control plane 321, and user plane 322. For example, if model 331 is intended to generate synthetic SINR KPIs, synthetic RSRP KPIs, and synthetic RSRQ KPIs, analytics system 323 may filter the received KPIs to select SINR KPIs, RSRP KPIs, and RSRQ KPIs while ignoring other KPIs. Analytics system 323 processes the selected KPIs using a DTW algorithm to uncover correlations between the KPIs. In this example, analytics system 323 uncovers correlations between the KPIs using a DTW algorithm, however in other examples, analytics system 323 may instead use UMAP, Fréchet distance, t-SNE, PAC, and/or another correlation algorithm. Analytics system 323 groups the correlated KPIs that share a related generation context. For example, analytics system 323 may group KPIs that we generated by rural RANs operating at 500 MHz. For each KPI group, analytics system 323 sorts the KPI group into ranges based on the total range of the numeric values in the KPI group. Analytics system 323 assigns a different string to each range and determines counts for the KPIs that fall within each range. Analytics system 323 tokenizes the KPIs of each range by replacing the numeric values of the KPIs with the string assigned to their corresponding range. Analytics system 323 transfers the tokenized KPIs groups to KPI store 324. KPI store 324 stores the tokenized KPIs to train machine learning model 331 to generate synthetic KPIs that realistically depict the status of network 300.

Figure 5:
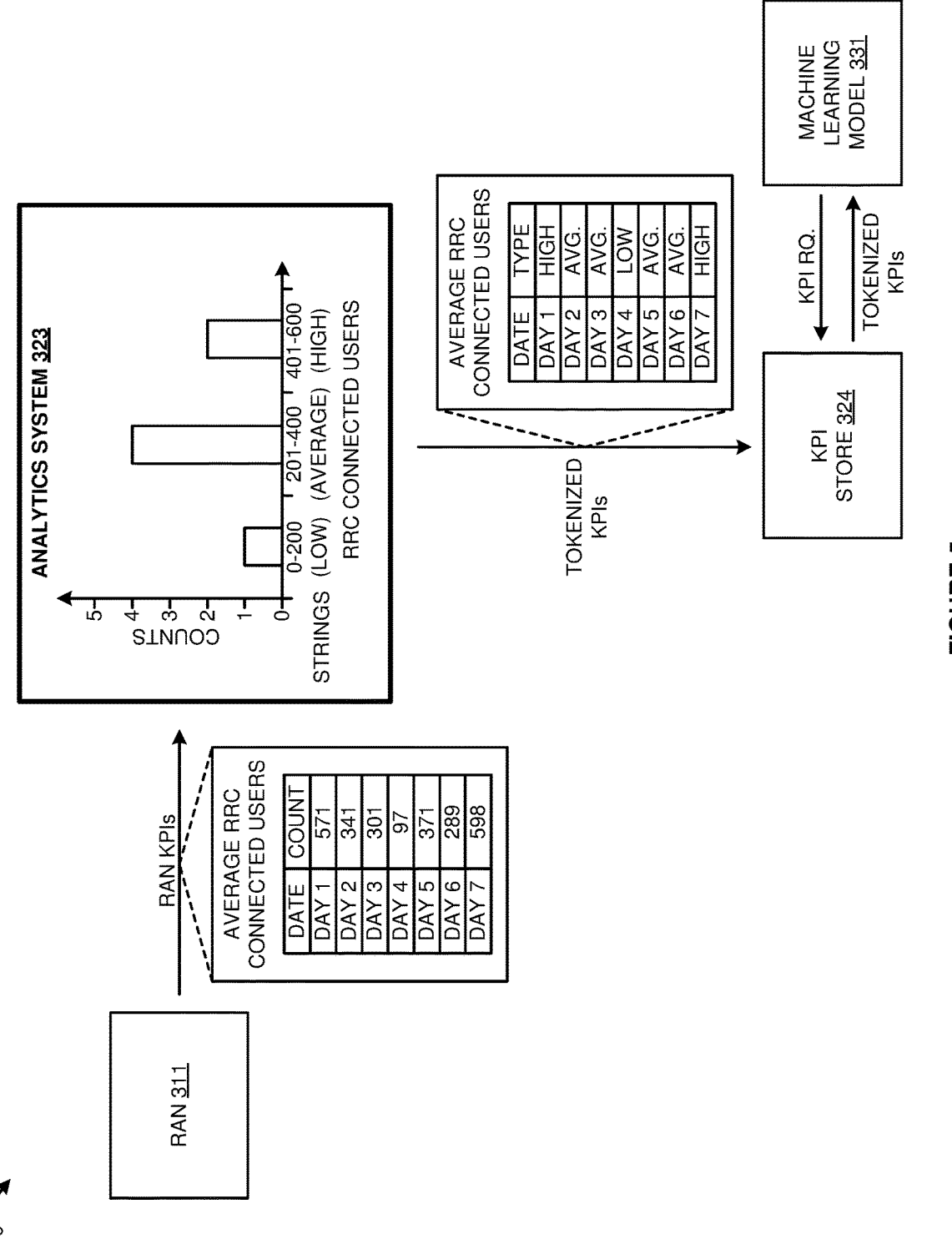
FIG. 5 illustrates an exemplary operation of the wireless communication network to anonymize network KPIs for machine learning training.

FIG. 5 further illustrates wireless communication network 300 network to anonymize network KPIs for machine learning training. In some examples, RAN 311 transfers RAN KPIs to analytics system 323. The RAN KPIs comprise average RRC connected users over a period of seven days. As illustrated in FIG. 5, RAN 311 had an average of 571 RRC connected users on day 1, had an average of 341 RRC connected users on day 2, had an average of 301 RRC connected users on day 3, had an average of 97 RRC connected users on day 4, had an average of 371 RRC connected users on day 5, had an average of 289 RRC connected users on day 6, and had an average of 598 RRC connected users on day 7. It should be appreciated that these numbers and the time period are exemplary and may differ in other examples.

Analytics system 323 hosts a data structure that implements the graph illustrated in FIG. 5. The x-axis of the graph plots RRC connected users in the ranges 0-200, 201-400, and 401-600. The y-axis of the graph plots the counts of the average RRC connected users that fell with each range. Analytics system 323 receives the RAN KPIs reported by RAN 311 and selects the ranges for the x-axis based on the overall range of the values. In this example, overall range spans from 97 RRC connected users reported on day 4 to 598 RRC connected users reported on day 7. Analytics system 323 buckets each of the numeric values into the corresponding ranges and determines the counts for each range. In this example, one KPI fell in the range 0-200, four KPIs fell in the range 201-400, and two KPIs fell in the range 401-600. Analytics system 323 selects strings for each of the ranges. Typically, the strings are selected to contextualize the numeric values without exposing the value itself. In this example, analytics system 323 assigned the string "LOW" for the KPI range 0-200, assigned the string "AVERAGE" for the KPI range 201-400, and assigned the string "HIGH" for the KPI range 401-600, however different strings may be used in other examples.

Analytics system 323 tokenizes the KPIs by replacing the numeric value with the string assigned to the KPI range that value fell in. As illustrated in FIG. 5, the tokenized KPI for day 1 is "HIGH", the tokenized KPI for day 2 is "AVERAGE", the tokenized KPI for day 3 is "AVERAGE", the tokenized KPI for day 4 is "LOW", the tokenized KPI for day 5 is "AVERAGE", the tokenized KPI for day 6 is "AVERAGE", and the tokenized KPI for day 7 is "HIGH". The tokenized KPIs depict the average amount of RRC connected users on RAN 311 without exposing the actual user amounts and the identity of RAN 311. Analytics system 323 transfers the tokenized KPIs to KPI store 324 which stores the tokens in memory. Analytics system 323 transfers statistical characteristics associated with the average amount of RRC connected users KPI to KPI store 324. Exemplary statistical characteristics include statistical distributions, string to range mappings, range averages, range standard deviations, and the like. KPI store 324 stores the statistical characteristics in association with the tokenized KPIs.

Machine learning model 331 may retrieve these tokenized KPIs from store 324 for training. In particular, model 331 trains its constituent algorithms using the tokenized KPIs and statistical characteristics to generate synthetic KPIs depicting average RRC connected users in network 300. An exemplary synthetic KPI stream may indicate a RAN in network 300 with similar characteristics to RAN 311 had an average of 550 RRC connected users on day 1, had an average of 328 RRC connected users on day 2, had an average of 284 RRC connected users on day 3, had an average of 146 RRC connected users on day 4, had an average of 393 RRC connected users on day 5, had an average of 309 RRC connected users on day 6, and had an average of 600 RRC connected users on day 7. It should be appreciated that these synthetic data values differ from the actual KPIs of RAN 311 but provide a realistic example of the operating conditions for a given RAN as the range of the synthetic KPIs is similar to that of the actual KPIs. When prompted, model 331 may provide synthetic KPIs to third-party entities, network operators, and the like. Although the above examples are given with respect to the average number of RRC connected users KPI, analytics system 323 may process and tokenize other KPIs (e.g., average RSRP) in a similar manner as described above.

Figure 6:
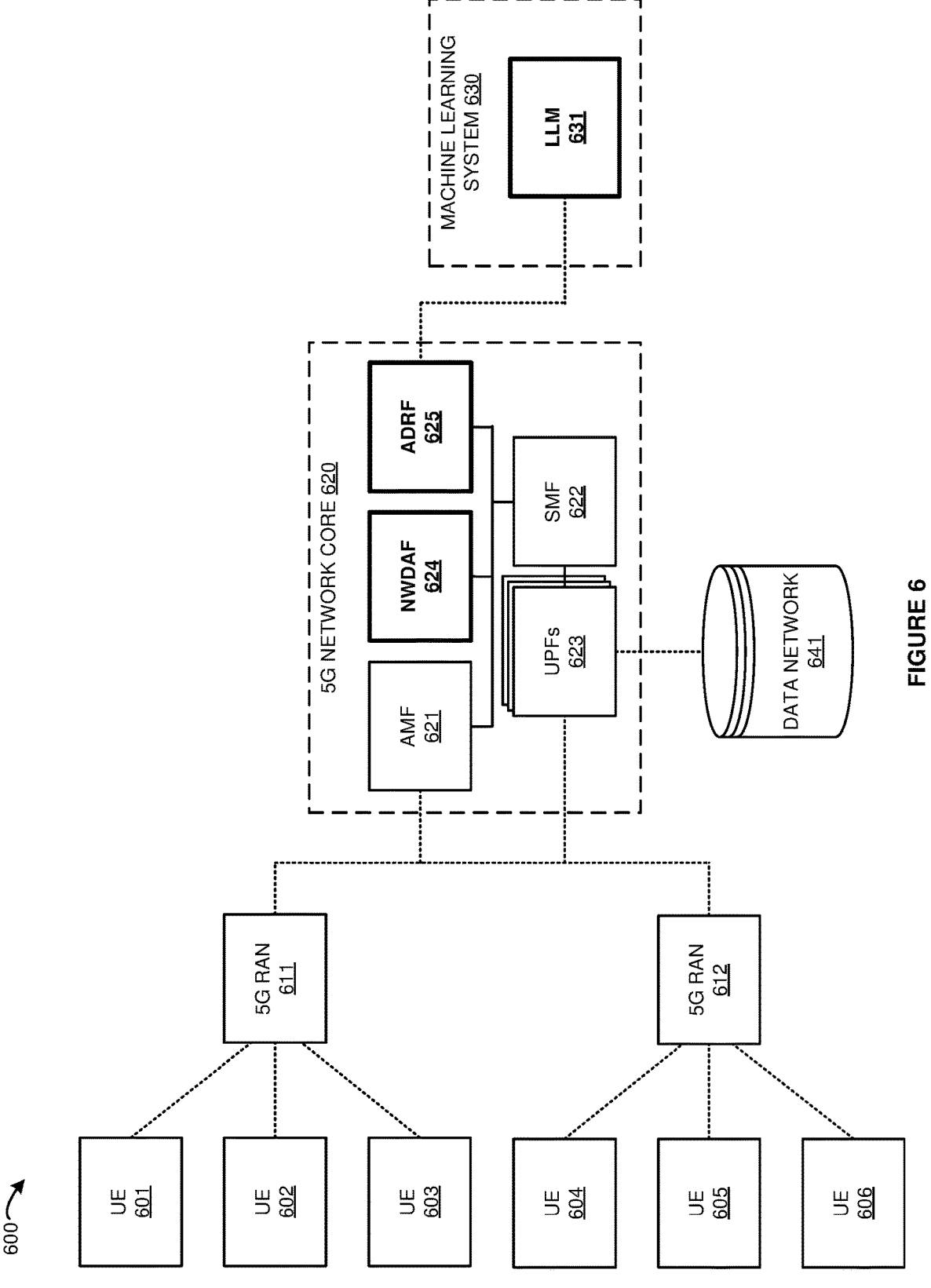
FIG. 6 illustrates a Fifth Generation (5G) communication network to anonymize network KPIs for machine learning training.

FIG. 6 illustrates 5G communication network 600 to anonymize network KPIs for machine learning training. 5G communication network 600 comprises an example of wireless communication networks 100 and 300, although networks 100 and 300 may differ. 5G communication network 600 comprises UEs 601-606, 5G RANs 611 and 612, 5G network core 620, machine learning system 630, and data network 641. Network core 620 comprises AMF 621, SMF 622, UPFs 623, NWDAF 624, and ADRF 625. Machine learning system 630 comprises Large Language Model (LLM) 631. Data network 641 comprises elements like AS. Other network functions and network elements like Authentication Server Function (AUSF), Network Slice Selection Function (NSSF), Policy Control Function (PCF), Unified Data Management (UDM), Unified Data Repository (UDR), Network Repository Function (NRF), Equipment Identity Register (EIR), Session Communication Proxy (SCP), Network Exposure Function (NEF), and Application Function (AF) are typically present in and 5G network core 620 but are omitted for clarity. In other examples, 5G communication network 600 may comprise different or additional elements than those illustrated in FIG. 6.

In some examples, 5G UE 601 wirelessly attaches to RAN 611. UE 601 exchanges attachment signaling with RAN 611 to establish a signaling link between the 5G network applications hosted by UE 601 and the 5G network applications hosted by RAN 611. The attachment signaling exchanged between UE 601 and RAN 611 involves a Random Access Channel (RACH) process to establish a secure signaling link. Sometimes, this process fails and a secure signaling link cannot be established which forces the UE (e.g., UE 601) to reattach. RAN 611 tracks RACH attachment success rate for UEs 601-603. As UEs 601-603 connect/disconnect to RAN 611, RAN 611 tracks the average number of RRC connected users on RAN 611. Although RANs 611 and 612 are illustrated as serving three UEs each, RANs 611 and 612 typically serve many more UEs, however the additional UEs are omitted for sake of clarity.

Once the signaling link is established, UE 601 transfers a registration request over the signaling link to RAN 611. The registration request includes information like a registration type, 5G-Global Unique Temporary Identifier (GUTI), UE capabilities, Network Slice Selection Assistance Information (NSSAI) requests, Protocol Data Unit (PDU) session requests, and the like. RAN 611 forwards the registration request for UE 601 to AMF 621. In response to the registration request, AMF 621 transfers an identity request to UE 601 over RAN 611. UE 601 indicates its Subscriber Concealed Identifier (SUCI) to AMF 621 over RAN 611. AMF 621 interfaces with other network functions like AUSF and UDM to authenticate UE 601. In particular, AMF 621 retrieves authentication vectors including an authentication challenge, key selection criteria, and a random number as well as the Subscriber Permanent Identifier (SUPI) for UE 601. AMF 621 indicates the authentication type and transfers the authentication challenge, key selection criteria, and random number to UE 601 over RAN 611. UE 601 hashes the random number using its copy of the secret key to generate an authentication response transfers the response to AMF 621 over RAN 611. AMF 621 matches the authentication response to the expected result to authenticate UE 601.

Responsive to the authentication, AMF 621 interacts with other network functions like UDM generate UE context and interacts with other network functions like PCF to select network policies for UE 601. The UE context comprises data like supported features, slice selection information, PDU session information, QoS metrics, service attributes, and the like. AMF 621 selects SMF 622 to establish the requested PDU sessions for UE 601 based on the UE context. SMF 622 selects one of UPFs 623 to establish the PDU session for UE 601. SMF 622 informs AMF 621 that the session context for the PDU session has been created. In response AMF 621 transfers a registration accept message to UE 601 over RAN 611. UE 601 receives the accept message and begins the PDU sessions over RAN 611. UE 601 wirelessly exchanges user data with the selected one of UPFs 623 over RAN 611. The selected one of UPFs 623 exchanges the user data with data network 641. AMF 621 and SMF 622 repeat the above authentication and registration procedures with UEs 602-606 to onboard and serve UEs 602-606.

AMF 621 and SMF 622 track the authentication success rate, requested PDU session types, requested slice types, security violations, handover requests, UPF selections, and/or other control plane KPIs for UEs 601-606. AMF 621 and SMF 622 are subscribed to NWDAF 624 for analytics reporting. For example, NWDAF 624 may transfer subscription requests to AMF 621 and SMF 622 for control plane KPI reporting. AMF 621 and SMF 622 report the authentication success rate, requested PDU session types, requested slice types, security violations, handover requests, UPF selections, and/or other control plane KPIs to NWDAF 624. As UPFs 623 serve UEs 601-606, UPFs 623 track user plane KPIs like average bitrate, data throughput, data latency, slice metrics, and the like. UPFs 623 are subscribed to NWDAF 624 for analytics reporting. For example, NWDAF 624 may transfer subscription requests to UPFs 623 for user plane KPI reporting. UPFs 623 report the user plane KPIs like average bitrate, data throughput, data latency, slice metrics, and/or other user plane KPIs to NWDAF 624.

RAN 611 wirelessly transfers measurement commands to UEs 601-603 to measure RSRQ. RSRP, and SINR. UEs 601-603 wirelessly receive the measurement commands and measure the RSRQ, RSRP, and SINR of the pilot signal broadcast by RAN 611. UEs 601-603 generate measurement reports that comprise the measured RSRQ. RSRP, and SINR values for RAN 611 and wirelessly transfer the measurement reports to RAN 611. RAN 611 averages the reported measurement statistics to determine average RSRQ and average RSRP and determines the percentage of UEs with SINR below 2 dB. As RAN 611 exchanges user data with UEs 601-603 for their respective PDU sessions, RAN 611 tracks total downlink traffic volume in Mbytes, the average downlink throughput in kbps, the downlink PRB utilization percentage, and the like. When UEs 601-603 initiate voice calls over RAN 611, RAN 611 tracks the total call count, the call access failure rate (including and excluding handovers), the call drop rate, total dropped calls, and the uplink call packet loss rate. The calls may comprise Voice Over New Radio (VoNR) calls, Voice Over Long Term Evolution (VOLTE) calls, and/or another type of voice/video call technology. RAN 611 is subscribed to NWDAF 624 for analytics reporting. For example, NWDAF 624 may transfer a subscription request to RAN 611 for RAN KPI reporting. RAN 611 reports RAN KPIs like RACH success rate, average number of RRC connected users, average RSRP, average RSRQ, percent of SINR below 2 dB, downlink traffic volume, average downlink throughput, downlink PRB utilization, the total call count, the call access failure rate (including and excluding handovers), the call drop rate, total dropped calls, the uplink call packet loss rate, and/or other RAN KPIs to NWDAF 624.

RAN 612 operates similarly to RAN 611. As UEs 604-606 attach to network core 620, RAN 612 tracks the RACH success rate and average number of RRC connected users on RAN 612. RAN 612 directs UEs 604-606 to measure RSRP, RSRQ, and SINR and determines average RSRP, average RSRQ, and the percent of UEs with SINR below 2 dB based on the reported metrics. RAN 612 tracks total downlink traffic volume, average downlink throughput, and downlink PRB utilization. When UEs 604-606 initiate voice calls over RAN 612, RAN 612 tracks the total call count, the call access failure rate (including and excluding handovers), the call drop rate, total dropped calls, and the uplink call packet loss rate. RAN 612 is also subscribed to NWDAF 624 for analytics reporting. Based on the subscription, RAN 612 reports RAN KPIs like RACH success rate, average number of RRC connected users, average RSRP, average RSRQ, percent of SINR below 2 dB, downlink traffic volume, average downlink throughput, downlink PRB utilization, the total call count, the call access failure rate (including and excluding handovers), the call drop rate, total dropped calls, the uplink call packet loss rate, and/or other RAN KPIs to NWDAF 624.

NWDAF 624 receives the control plane KPIs reported by AMF 621 and SMF 622, the user plane KPIs reported by UPFs 623, and the RAN KPIs reported by RANs 611 and 612. NWDAF 624 filters the reported KPIs based on the intended function of LLM 631. LLMs are a type of artificial neural network that can process human language requests and generate outputs that mimic human language. In this example, LLM 631 is a machine learning model trained to generate synthetic KPIs for use by network operators and third-parties. The synthetic KPIs comprise data that mimics network 600's actual KPIs but that do not expose network capabilities, network performance, RAN and network function identities, user information, and the like. LLM 631 may be trained to produce synthetic RAN KPIs, synthetic user plane KPIS, synthetic control plane KPIs, and/or another type of network KPIs. NWDAF 624 filters the reported KPIs based on the type of KPIs LLM 631 is trained to output. For example, when LLM 631 is trained to output synthetic RAN KPIs, NWDAF 624 may select KPIs reported by RANs 611 and 612 and may ignore KPIs reported by other entities (e.g., AMF 621) in network 600. To inhibit excessive amounts of data, NWDAF 624 typically selects 10-15 of the KPIs most relevant to the function of LLM 631.

Once NWDAF 624 has selected the desired KPIs, NWDAF 624 determines correlations between the selected KPIs. NWDAF 624 hosts a data structure that implements a DTW algorithm. DTW algorithms are used to measure similarity between temporal data sequences. In general, DTW algorithms uncover matches between two given data sequences (e.g., time series). NWDAF 624 inputs the selected KPIs into the data structure which outputs correlations between the KPIs. NWDAF 624 forms KPI groups based on the identified correlations. For example, an output from the data structure may indicate the KPIs for downlink throughput, PRB utilization, and SINR are highly correlated. NWDAF 624 may then form a KPI group that comprises the downlink throughput, PRB utilization, and SINR KPIs. NWDAF 624 may determine correlated KPIs using different time averaging. For example, NWDAF 624 may average KPIs over a selected time period and then determine correlations between the averaged KPIs. Exemplary time periods include 15-minute time windows over a period of seven days, 24-hour time windows over a period of three weeks, or 30-day time windows over a period of four months. For example, NWDAF 624 may average PRB utilization over 24-hour periods spanning a week and then process the average PRB utilizations using the DTW algorithm to identify correlations. In some examples, the data structure hosted by NWDAF 624 implements another correlation algorithm like UMAP, Fréchet distance, t-SNE, PAC, and the like. In some examples, the data structure hosted by NWDAF 624 implements multiple correlation algorithms. For example, the data structure may implement a DTW algorithm, a UMAP algorithm, and a Fréchet distance algorithm to measure similarities between the KPIs and uncover correlations.

NWDAF 624 sorts the KPI groups based on the context in which the KPIs were generated. The generation context may include factors like network conditions, access network technology, access network configuration, geographic location, and time period. Exemplary network conditions include heavy loading, light loading, and optimized loading. Exemplary access technologies include 6G, 5GNR, and LTE. Exemplary access network configurations include Massive Input Massive Output (MIMO), carrier aggregation, bandwidth, and frequency range. Exemplary geographic locations include urban sites, suburban sites, and rural sites. Exemplary time periods include specific days (e.g., Monday), specific dates (10/11/2023), and time ranges (e.g., a week). For example, NWDAF 624 may identify KPI groups that were generated by a 5GNR suburban RANs operating under heavy loading. The specific generation context combinations used by NWDAF 624 may be operator defined, preconfigured, selected based on the relevance to LLM 631, selected randomly, and/or based on some other selection criteria.

Once the KPI groups have been sorted based on their generation context, NWDAF 624 tokenizes the KPIs to anonymize data that may reveal network capabilities, network performance, network architecture, user information, and the like. For each KPI in a KPI group, NWDAF 624 determines the overall range of numeric values that compose that KPI. For example, NWDAF 624 may determine that the SINR KPI values range from −8 dB to 31 dB. NWDAF 624 selects KPI ranges based on the overall range of the KPIs. For example, NWDAF 624 may select the ranges SINR ≤−5 dB, −5 dB≤SINR≤5 dB, 5 dB≤SINR≤15 dB, 15 dB≤SINR≤25 dB, and 25 dB≤SINR based on the overall SINR range of −8 dB to 31 dB. Once the ranges are defined, NWDAF 624 selects strings to represent each of the ranges. For example, NWDAF 624 may apply the following table to select the strings:

| SINR Range | String |
|---|---|
| SINR ≤ −5 dB | "black" |
| −5 dB ≤ SINR ≤ 5 dB | "red" |
| 5 dB ≤ SINR ≤ 15 dB | "orange" |
| 15 dB ≤ SINR ≤ 25 dB | "yellow" |
| 25 dB ≤ SINR | "green" |

It should be appreciated that these KPI ranges and the corresponding strings are exemplary and may differ in other examples. NWDAF 624 assigs each KPI in the KPI group to their respective ranges and tokenizes each KPI in the KPI groups by converting the numeric value of the KPI into the string assigned to that KPIs range. For example, a KPI SINR with the value of 13 dB would map to the string "orange" based on the above table. The resulting KPI tokens comprise strings like SINROrange, SINRGreen, and the like. A tokenized KPI group comprises a string that represents the numeric values of the KPIs that compose the group. For example, a KPI group may comprise SINR, downlink throughput, and PRB utilization and NWDAF 624 may tokenize the KPI group as the string DLTPYellow_PRBURed_SINRYellow.

NWDAF 624 transfers the tokenized KPI groups organized based on their generation context to ADRF 625. NWDAF 624 may indicate contextual information like string to range mappings, KPI averages, and KPI standard deviations to ADRF 625. ADRF 625 stores the tokenized KPIs and additional information in memory. ADRF 625 stores the tokenized KPI groups based on the generation context. For example, ADRF 625 may create a KPI profile of KPIs generated by 5GNR rural RANs using MIMO on Sunday and store the tokenized KPI groups with that generation context in the KPI profile. ADRF 625 may utilize storage options like a relational database, Hadoop distributed file system, a Not Only SQL (NoSQL) storage system, and the like to store the tokenized KPIs. The tokenized KPIs stored by ADRF 625 are accessible by LLM 631 to train its constituent machine learning algorithms.

Once a sufficient body of tokenized KPIs is created (e.g., based on an operator defined metric), LLM 631 retrieves the tokenized KPIs from ADRF 625. LLM 631 trains its constituent machine learning algorithms using the tokenized KPIs to produce synthetic KPI streams that mimic the actual network KPIs. LLM 631 may be trained using self-supervised learning, semi-supervised learning, or some other machine learning training technique.

To train its constituent algorithms, LLM 631 converts the tokenized KPIs into numeric values and groups the numeric values into feature vectors interpretable by the algorithms. For example, LLM 631 may retrieve the tokenized KPIs SINRRed, SINR Yellow, and SINRGreen from ADRF 625 and assign different numeric values to each of the tokenized KPIs. LLM 631 may form feature vectors that comprise the numeric values to represent these strings. LLM 631 trains its constituent algorithms to output synthetic KPIs based on the feature vector. In some examples, LLM 631 may generate feature vectors based on the numeric ranges for each tokenized KPI. For example, LLM 631 may retrieve the tokenized SINROrange and the string to range mapping for SINR KPI tokens. The string to range mapping may indicate Orange corresponds to a SINR between 5 dB and 15 dB. LLM 631 may select a numeric value within that range (e.g., 10 dB) and form a feature vector that represents SINR comprising that numeric value. The values may be selected randomly or may be selected based on the average and standard deviation for the KPI. It should be appreciated that back-converting the strings to numeric values further randomizes and anonymizes the actual network KPI data. In some examples, the training operations comprise a continuous process to maintain LLM 631's algorithms up-to-date with the current conditions of network 600.

Once LLM 631 is sufficiently trained (e.g., based on an operator defined metric), LLM 631 may receive requests from operators and third-party entities for network KPIs. The requests comprise natural language requests. For example, a network operator may transfer a request that reads, "list 24 hours of KPIs for a suburban MIMO RAN operating at 800 MHz on a Thursday." LLM 631 may receive the request and then generate a stream of synthetic KPIs depicting a 24-hour period of operation for a suburban MIMO RAN operating at 800 MHz. The output from LLM 631 may comprise a stream of synthetic text KPIs or a stream of synthetic numeric KPIs. For example, LLM 631 may output strings (e.g., SINROrange, SINRYellow, SINR-Black) to generate the stream of synthetic text KPIs. To convert the synthetic strings into numeric values, LLM 631 retrieves statistical characteristics like the statistical distributions, range mappings, KPI averages, and KPI standard deviations for the synthetic text KPIs from memory. The statistical characteristics may be stored locally on LLM 631 or may be retrieved from ADRF 625. LLM 631 converts the synthetic text KPIs into numeric values based on the statistical characteristics to generate a stream of synthetic numeric KPIs. For example, LLM 631 may convert the synthetic text KPI output SINROrange to a numeric value of 9 dB based on the statistical distribution (e.g., normal), range mapping (e.g., −5 dB to 15 db), KPI average (e.g., 10 dB), and KPI standard deviation (e.g., 3 dB) for the KPI token.

Although the above examples are given with respect to training LLM 631 using NWDAF 624 and ADRF 625, in other examples LLM 631 may be trained using a RAN Intelligent Controller (RIC). When a RIC is used (in place of or in addition to NWDAF 624), RANs 611 and 612 may comprise Open-RAN (O-RAN) compliant systems. In such examples, RANs 611 and 612 report their RAN KPIs to the RIC. The RIC operates similarly to NWDAF 624 to select KPIs based on the function of LLM 631, derive correlations between the selected KPIs, group the KPIs based on the operational/site context of RANs 611 and 612, and tokenize the grouped KPIs. The RIC may store tokenized KPIs in ADRF 625 (or other suitable data system) which are then accessed by LLM 631 for training. Alternatively, the RIC may store the tokenized KPIs locally and provide the tokenized KPIs to LLM 631 per request.

Figure 7:
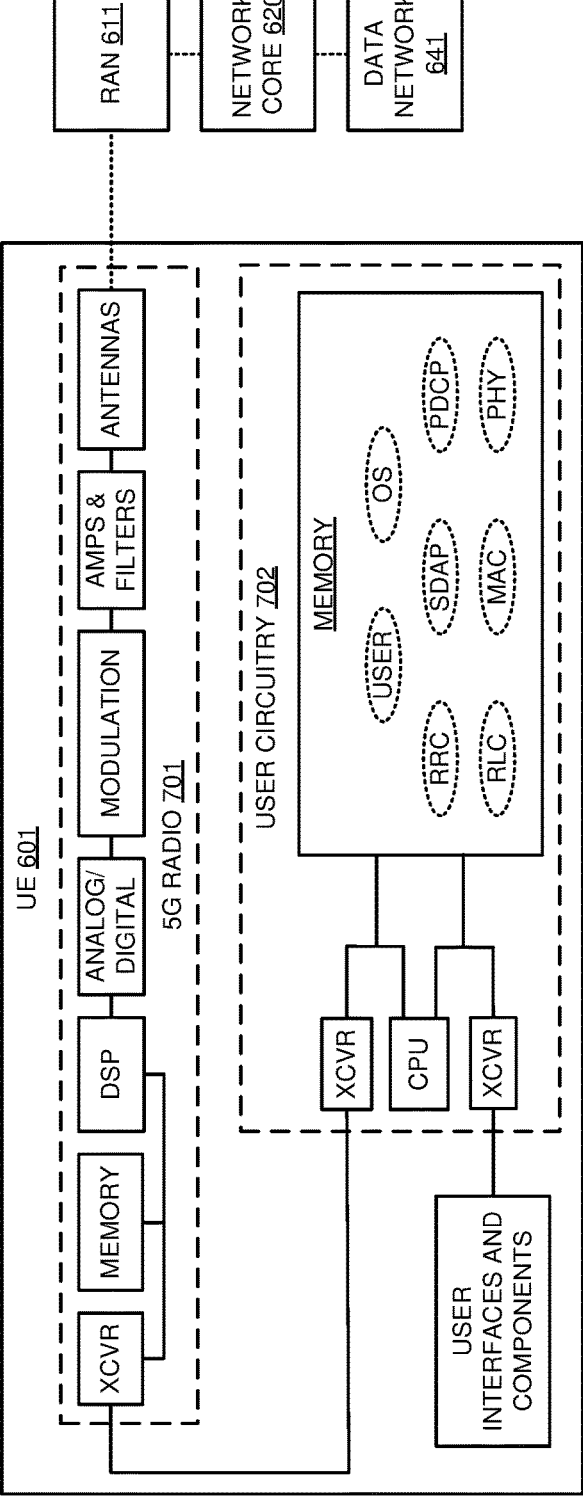
FIG. 7 illustrates a 5G User Equipment (UE) in the 5G communication network.

FIG. 7 illustrates 5G UE 601 in 5G communication network 600. UE 601 comprises an example of user device 101-103 illustrated in FIG. 1 and UEs 301-303 illustrated FIG. 3, however user devices 101-103 and UEs 301-303 may differ. 5G UEs 602-606 comprise similar (or the same)

architecture as 5G UE 601. UE 601 comprises 5G radio 701 and user circuitry 702. Radio 701 comprises antennas, amplifiers, filters, modulation, analog-to-digital interfaces, Digital Signal Processors (DSP), memory, and transceivers (XCVRs) that are coupled over bus circuitry. User circuitry 702 comprises memory, CPU, user interfaces and components, and transceivers that are coupled over bus circuitry. The memory in user circuitry 702 stores an operating system (OS), user applications (USER), and 5GNR network applications for Physical Layer (PHY), Media Access Control (MAC), Radio Link Control (RLC), Packet Data Convergence Protocol (PDCP), Service Data Adaptation Protocol (SDAP), and Radio Resource Control (RRC). The antenna in radio 701 is wirelessly coupled to 5G RAN 611 over a 5GNR link. A transceiver in radio 701 is coupled to a transceiver in user circuitry 702. A transceiver in user circuitry 702 is typically coupled to the user interfaces and components like displays, controllers, and memory.

In radio 701, the antennas receive wireless signals from 5G RAN 611 that transport downlink 5GNR signaling and data. The antennas transfer corresponding electrical signals through duplexers to the amplifiers. The amplifiers boost the received signals for filters which attenuate unwanted energy. Demodulators down-convert the amplified signals from their carrier frequency. The analog/digital interfaces convert the demodulated analog signals into digital signals for the DSPs. The DSPs transfer corresponding 5GNR symbols to user circuitry 702 over the transceivers. In user circuitry 702, the CPU executes the network applications to process the 5GNR symbols and recover the downlink 5GNR signaling and data. The 5GNR network applications receive new uplink signaling and data from the user applications. The network applications process the uplink user signaling and the downlink 5GNR signaling to generate new downlink user signaling and new uplink 5GNR signaling. The network applications transfer the new downlink user signaling and data to the user applications. The 5GNR network applications process the new uplink 5GNR signaling and user data to generate corresponding uplink 5GNR symbols that carry the uplink 5GNR signaling and data.

In radio 701, the DSP processes the uplink 5GNR symbols to generate corresponding digital signals for the analog-to-digital interfaces. The analog-to-digital interfaces convert the digital uplink signals into analog uplink signals for modulation. Modulation up-converts the uplink analog signals to their carrier frequency. The amplifiers boost the modulated uplink signals for the filters which attenuate unwanted out-of-band energy. The filters transfer the filtered uplink signals through duplexers to the antennas. The electrical uplink signals drive the antennas to emit corresponding wireless 5GNR signals to 5G RAN 611 that transport the uplink 5GNR signaling and data.

RRC functions comprise authentication, security, handover control, status reporting, QoS, network broadcasts and pages, and network selection. SDAP functions comprise QoS marking and flow control. PDCP functions comprise security ciphering, header compression and decompression, sequence numbering and re-sequencing, de-duplication. RLC functions comprise Automatic Repeat Request (ARQ), sequence numbering and resequencing, segmentation and resegmentation. MAC functions comprise buffer status, power control, channel quality, Hybrid ARQ (HARQ), user identification, random access, user scheduling, and QoS. PHY functions comprise packet formation/deformation, windowing/de-windowing, guard-insertion/guard-deletion, parsing/de-parsing, control insertion/removal, interleaving/de-interleaving, Forward Error Correction (FEC) encoding/ decoding, channel coding/decoding, channel estimation/ equalization, and rate matching/de-matching, scrambling/ descrambling, modulation mapping/de-mapping, layer mapping/de-mapping, precoding, Resource Element (RE) mapping/de-mapping, Fast Fourier Transforms (FFTs)/Inverse FFTs (IFFTs), and Discrete Fourier Transforms (DFTs)/Inverse DFTs (IDFTs).

In some examples, UE 601 receives a measurement command from RAN 611 to measure RSRQ, RSRP, and SINR for the pilot signal broadcast by RAN 611. The command may identify a specific frequency range, select resource blocks, or other aspects of the pilot signal to measure. The RRC in UE 601 processes the command and directs the PHY in UE 601 to measure the indicated signal metrics. The PHY senses the pilot signal broadcast by RAN 611 to measure the RSRQ. RSRP, and SINR and indicates the measurements to the RRC. The RRC generates a measurement report comprising the measured RSRQ. RSRP, and SINR values. The RRC controls the low-layer network functions (e.g., PDCP, RLC, MAC, and PHY) to wirelessly transfer the measurement report to RAN 611.

Figure 8:
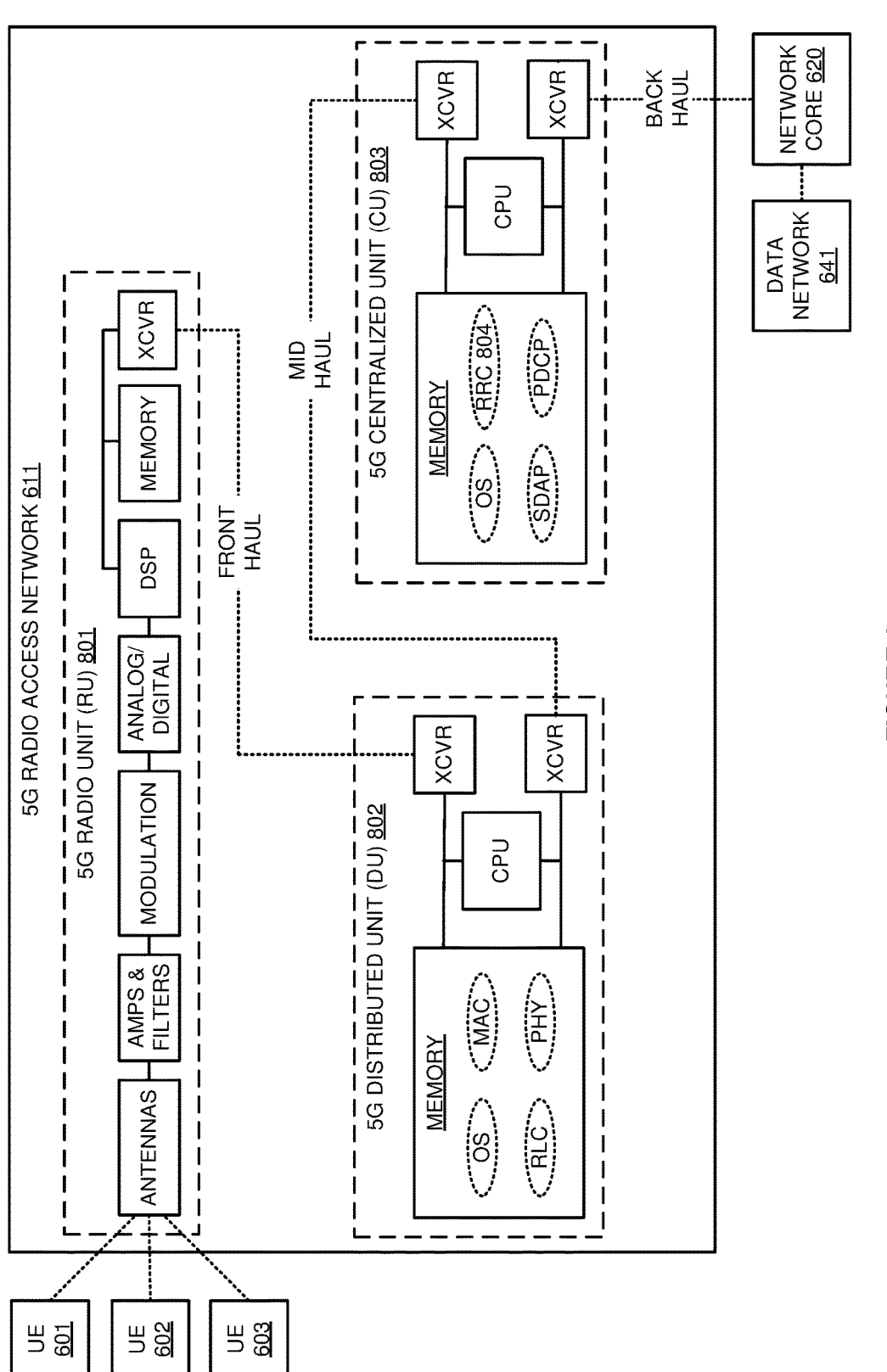
FIG. 8 illustrates a 5G Radio Access Network (RAN) in the 5G communication network.

FIG. 8 illustrates 5G RAN 611 in 5G communication network 600. 5G RAN 611 comprises Radio Unit (RU) 801, Distributed Unit (DU) 802, and Centralized Unit (CU) 803. RAN 611 comprises an example of access networks 111-113 illustrated in FIG. 1 and RAN 311 illustrated in FIG. 3, however access networks 111-113 and RAN 311 may differ. RAN 612 comprises a similar (or the same) architecture as RAN 611.

RU 801 comprises antennas, amplifiers, filters, modulation, analog-to-digital interfaces, DSP, memory, and transceivers (XCVRs) that are coupled over bus circuitry. UE 601 is wirelessly coupled to the antennas in RU 801 over 5GNR links. Transceivers in 5G RU 801 are coupled to transceivers in 5G DU 802 over fronthaul links like enhanced Common Public Radio Interface (eCPRI). The DSPs in RU 801 executes their operating systems and radio applications to exchange 5GNR signals with UE 601 and to exchange 5GNR data with DU 802.

For the uplink, the antennas receive wireless signals from UE 601 that transport uplink 5GNR signaling and data. The antennas transfer corresponding electrical signals through duplexers to the amplifiers. The amplifiers boost the received signals for filters which attenuate unwanted energy. Demodulators down-convert the amplified signals from their carrier frequencies. The analog/digital interfaces convert the demodulated analog signals into digital signals for the DSPs. The DSPs transfer corresponding 5GNR symbols to DU 802 over the transceivers.

For the downlink, the DSPs receive downlink 5GNR symbols from DU 802. The DSPs process the downlink 5GNR symbols to generate corresponding digital signals for the analog-to-digital interfaces. The analog-to-digital interfaces convert the digital signals into analog signals for modulation. Modulation up-converts the analog signals to their carrier frequencies. The amplifiers boost the modulated signals for the filters which attenuate unwanted out-of-band energy. The filters transfer the filtered electrical signals through duplexers to the antennas. The filtered electrical signals drive the antennas to emit corresponding wireless signals to UE 601 that transport the downlink 5GNR signaling and data.

DU 802 comprises memory, CPU, and transceivers that are coupled over bus circuitry. The memory in 5G DU 802 stores operating systems and 5GNR network applications like PHY, MAC, and RLC. CU 803 comprises memory, CPU, and transceivers that are coupled over bus circuitry.

The memory in CU 803 stores an operating system and 5GNR network applications like PDCP, SDAP, and RRC 804. Transceivers in 5G DU 802 are coupled to transceivers in RU 801 over front-haul links. Transceivers in DU 802 are coupled to transceivers in CU 803 over mid-haul links. A transceiver in CU 803 is coupled to network core 620 over backhaul links.

RLC functions comprise ARQ, sequence numbering and resequencing, segmentation and resegmentation. MAC functions comprise buffer status, power control, channel quality, HARQ, user identification, random access, user scheduling, and QoS. PHY functions comprise packet formation/deformation, guard-insertion/guard-deletion, parsing/de-parsing, control insertion/removal, interleaving/de-interleaving, FEC encoding/decoding, channel coding/ decoding, channel estimation/equalization, and rate matching/de-matching, scrambling/descrambling, modulation mapping/de-mapping, layer mapping/de-mapping, precoding. RE mapping/de-mapping. FFTs/IFFTs, and DFTs/ IDFTs. PDCP functions include security ciphering, header compression and decompression, sequence numbering and re-sequencing, de-duplication. SDAP functions include QoS marking and flow control. RRC 804 functions include authentication, security, handover control, status reporting, QoS, network broadcasts and pages, network selection, and RAN KPI reporting.

In some examples, RRC 804 in CU 803 receives attachement signaling from UEs 601-603. RRC 804 participates in a RACH procedure to establish secure signaling links with UEs 601-603. RRC 804 tracks the success rate for the RACH procedures and stores the success rate as a KPI. Once the signaling links (e.g., signaling bearers) are set up, UEs 601-603 become RRC connected UEs. RRC 804 tracks the average number of RRC connected users on RAN 611 and stores the average as a KPI. RRC 804 exchanges authentication and registration signaling between AMF 621 and UEs 601-603. After successfully registering on network 600 and in response to direction by AMF 621, RRC 804 sets up the data links (e.g., data bearers) to support the PDU sessions for UEs 601-603.

RRC 804 periodically requires UEs 601-603 to measure radio metrics to determine when handover is required. RRC 804 controls the lower layer network functions (e.g., PDCP, RLC, MAC, and PHY) to wirelessly transfer measurement commands to UEs 601-603. The measurement commands include instructions that direct UEs 601-603 to measure RSRQ, RSRP, and SINR of the pilot signal broadcast by RAN 611. RRC 804 subsequently receives measurement reports from UEs 601-603 and determines average RSRQ, average RSRP, and average SINR based on the reported metrics. RRC 804 stores the radio metric averages as RAN KPIs.

As RAN 611 exchanges user data with UEs 601-603 for their respective PDU sessions, RRC 804 tracks total downlink traffic volume, the average downlink throughput, the downlink PRB utilization, and the like. For example, RRC 804 may request these metrics from the SDAP in CU 803. When UEs 601-603 initiate voice calls over RAN 611, RRC 804 tracks the total call count, the call access failure rate percent, the call drop percent, total dropped calls, and the uplink call packet loss percent. For example, RRC 804 may request the call metrics from the SDAP in CU 803. In should be appreciated that SDAP handles data exchange between UEs and the network user plane. As such, the PDU session and voice call metrics are readily available to the SDAP.

RAN 611 is subscribed to NWDAF 624 for analytics reporting. RRC 804 generates KPI reports that comprise the RACH success rate, average number of RRC connected users, average RSRP, average RSRQ, average SINR, downlink traffic volume, average downlink throughput, downlink PRB utilization, the total call count, the call access failure rate percent, the call drop percent, total dropped calls, and the uplink call packet loss percent. RRC 804 transfers the KPI reports to NWDAF 624 over AMF 621. RRC 804 may transfer the KPI reports based on a reporting schedule and/or the transfer may be event driven. In some examples, RAN 611 may comprise an O-RAN compliant system operatively coupled to a RIC resident in 5G network core 620. RU 801, DU 802, and CU 803 may instead (or additionally) report their RAN KPIs to the RIC. The RIC operates similarly to NWDAF 624 to select KPIs based on the function of LLM 631, derive correlations between the selected KPIs, group the KPIs based on operational/site context of RAN 611, and tokenize the grouped KPIs to train LLM 631.

Figure 9:
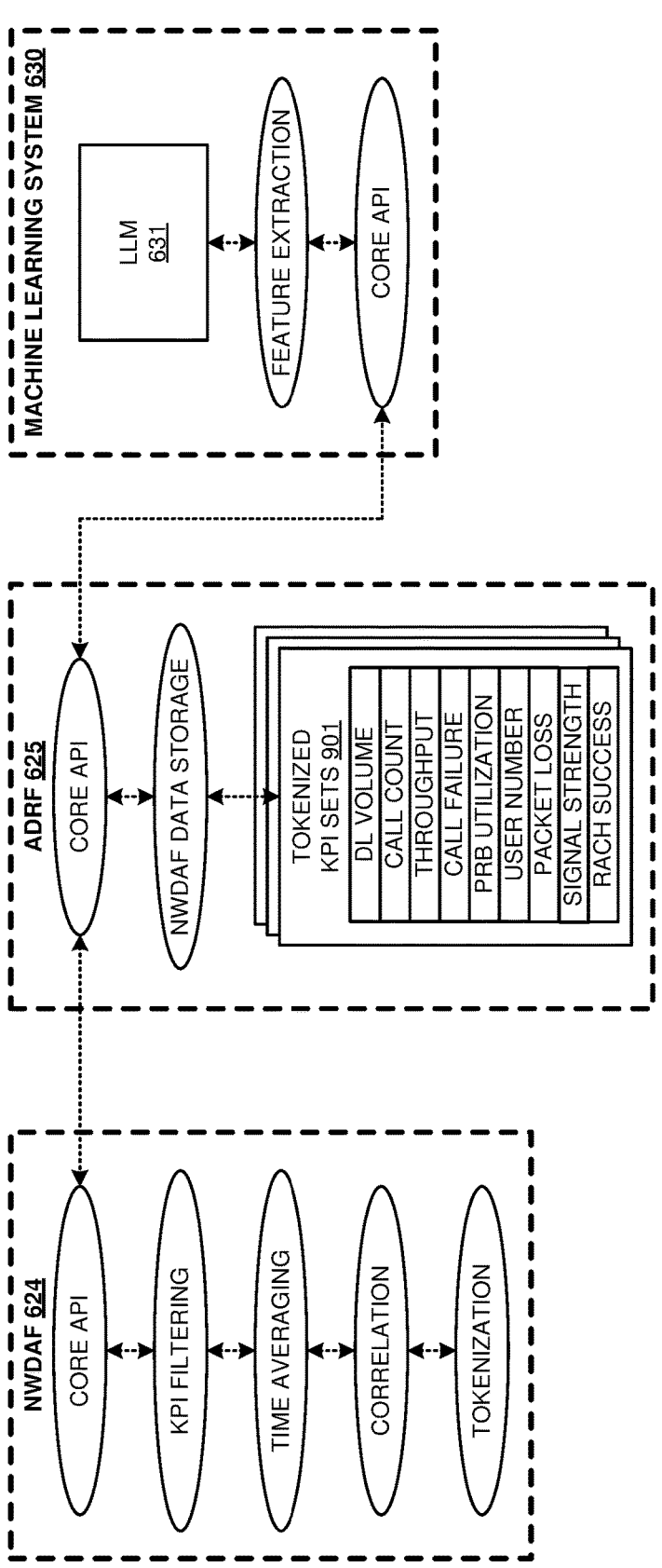
FIG. 9 illustrates network functions in the 5G communication network.

FIG. 9 illustrates NWDAF 624, ADRF 625, and LLM 631 in wireless communication network 600. NWDAF 624 comprises modules for core Application Programming Interface (API), KPI filtering, KPI time averaging, KPI correlation, and KPI tokenization. The core APIs allow NWDAF 624, ADRF 625, and machine learning system 630 to exchange signaling with each other, the other network functions in 5G core 620, with edge systems like RANs 611 and 612, and with third-party entities. The KPI filtering module filters RAN KPIs, control plane KPIs, user plane KPIs, and/or other network KPIs based on relevance. The filtering module may filter network KPIs based on an intended function of LLM 631 or to depict particular network conditions. For example, the filtering module may filter network KPIs for specific network conditions (e.g., depict heavily loaded network conditions, lightly loaded network conditions, optimized network conditions, etc.) and may filter KPIs based on the function of LLM 631 (e.g., to produce synthetic control plane KPIs). The KPI time averaging module averages network KPIs for a defined period of time. For example, KPIs captured over 24-hour periods may be averaged in four-hour increments while KPIs captured over seven-day periods may be averaged over daily increments. The KPI correlation module determines relationships between different network KPI and groups the KPIs based on the identified relationships. For example, the correlation module may determine that the KPI for authentication success rate and the KPI for average number of RRC connected users are related and may group these two KPIs based on the relationship (e.g., as the number of RRC connected users increases, the authentication success rate may decrease). The KPI correlation module may implement a DTW algorithm to determine the correlations. The KPI tokenization module converts numeric KPI values (e.g., average downlink throughput) into strings (e.g., high, medium, low, etc.). The tokenization anonymizes the actual network data while providing synthetic KPIs that realistically depict network conditions.

ADRF 625 comprises modules for core API and NWDAF data storage and stores tokenized KPI sets 901. The NWDAF data storage module formats incoming data received from NWDAF 624 for storage and retrieves the stored data from in response to data requests. Tokenized KPI sets 901 comprise tokenized KPIs that are grouped based on generation context. The KPIs may be organized to depict particular network conditions (e.g., heavy loading), to depict particular network locations (e.g., suburban cell sites), to depict particular RATs (e.g., 5GNR MIMO at 800 MHz), to depict particular time periods (e.g., Thursday), and the like. As illustrated in FIG. 9, Tokenized KPI sets 901 comprise the tokenized KPIs generated by NWDAF 624 for downlink (DL) traffic volume, call count, throughput, call failure rate, Physical Resource Block (PRB) utilization, average number of users, packet loss rate, signal strength, and RACH success rate. These tokenized KPIs are exemplary and may differ in other examples. Tokenized KPI sets 901 may be provided to machine learning system 630 to train LLM 631.

Machine learning system 630 comprises modules for core API and feature extraction and hosts LLM 631. The feature extraction module generates feature vectors for LLM 631 based on tokenized KPI sets 901 provided by ADRF 625. A feature vector comprises a set of numeric values interpretable by LLM 631 that represent a piece of data. For example, the feature extraction module may generate a feature vector to depict the downlink throughput KPI. Since the tokenized KPIs comprise strings, it should be appreciated that converting the strings back into numeric values to form the feature vectors further anonymizes the network KPIs. For example, the tokenized call count KPI may comprise the strings high, medium, and low as well as counts for each of the ranges (e.g., 304 instances of medium call count conditions). ADRF 625 indicates the numeric ranges for each tokenized KPI to machine learning system 630 (e.g., medium corresponds to a range of 200-400). The feature extraction module selects numeric values to depict the call count KPI token based on the numeric ranges for the tokens and the counts for each token. For example, the feature extraction module may produce a set of random numbers to form the feature vector depicting the call count KPI based on the count and numeric range for the token. Alternatively, the feature extraction module may select numeric values to form the feature vectors based on the average and standard deviation for token. For example, the range for the medium call count KPI may comprise 200-400, the count for the medium call count KPI may comprise 604, the average call count may comprise 289, and the standard deviation may comprise 25. In response, the feature extract module may select 604 numeric values within the range 200-400 based on the average value of 289 and the standard deviation of 25 to form the feature vector.

The feature extraction module provides the feature vectors to LLM 631 to train (or update the training) LLM 631's algorithms to produce synthetic KPI streams. Once trained, LLM 631 may receive natural language requests for KPIs and produce a stream of corresponding synthetic KPIs based on the request. For example, LLM 631 may receive a request that reads, "list daily average RRC connected users for urban RANs during October." LLM 631 may process the request and generate a machine learning output that comprises a set of 31 synthetic KPIs depicting the average amount of RRC connected users for each day in October. The synthetic KPIs differ from the network 600's actual average RRC connected users for urban RANs during October but still depict realistic network conditions. For example, the synthetic KPIs and the actual KPIs may compare as follows:

| DATE | Average RRC connected users for urban RANs (Actual) | Average RRC connected users for urban RANs (Synthetic) |
|---|---|---|
| 10/1 | 1041 | 1105 |
| 10/2 | 948 | 1003 |
| 10/3 | 901 | 888 |
| 10/5 | 1033 | 1030 |
| 10/6 | 1189 | 1092 |
| 10/7 | 804 | 831 |

As illustrated in the above table, the synthetic KPIs comprise different numeric values than the actual KPIs but fall within a similar range. As such, the outputs from LLM 631 are able to depict realistic network conditions without exposing network capabilities, network performance, RAN IDs, network function IDs, and user information. The synthetic KPIs output by LLM 631 may comprise numeric values or strings. When the outputs comprise strings, LLM 631 accesses the statistical distribution, range mapping, KPI average, and KPI standard deviation for that KPI. LLM 631 then converts the strings into random numeric values using the statistical distribution, range mapping, KPI average, and KPI standard deviation to generate the stream of synthetic numeric KPIs.

Figure 10:
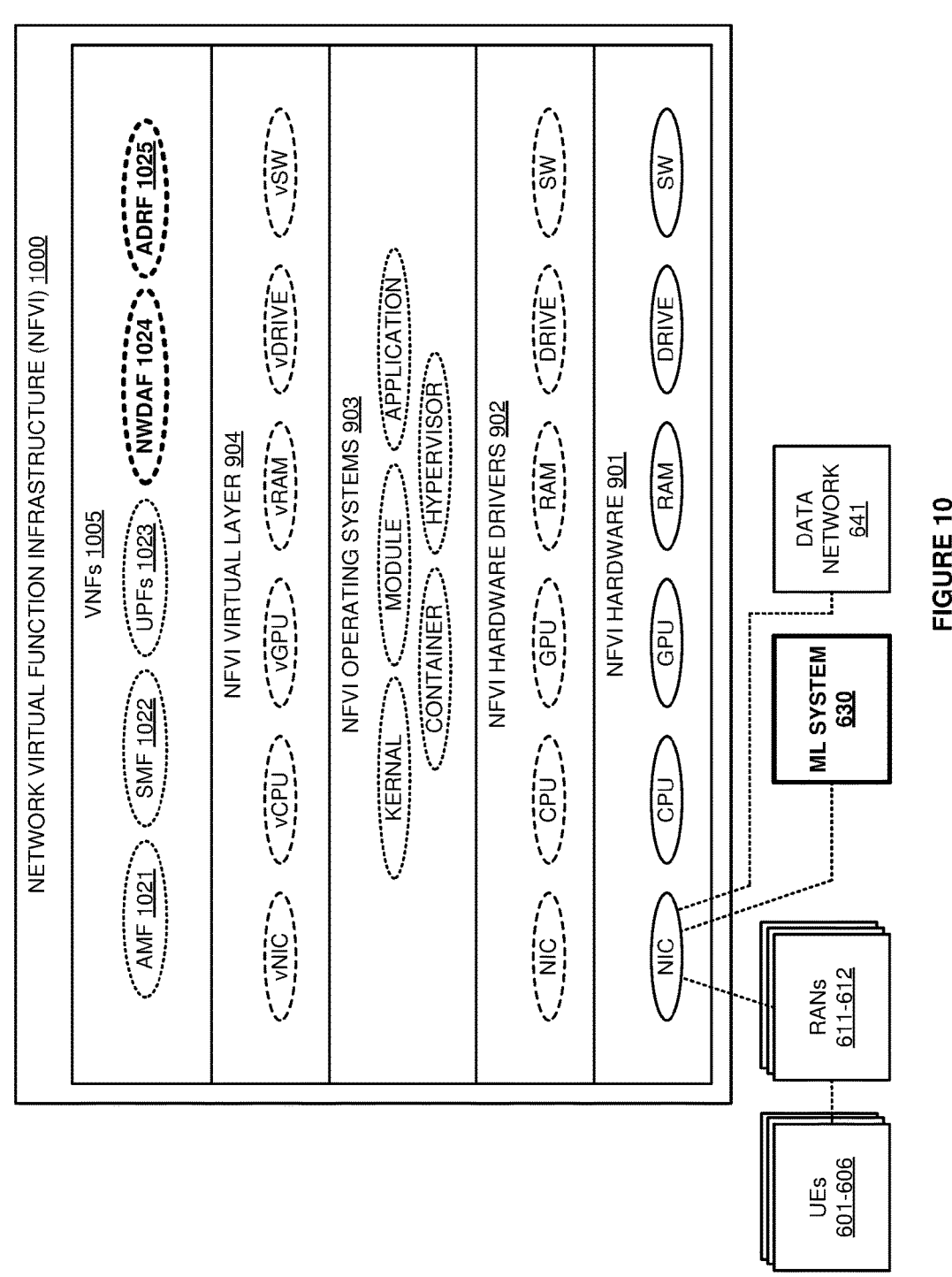
FIG. 10 illustrates a Network Function Virtualization Infrastructure (NFVI) in the 5G communication network.

FIG. 10 illustrates Network Function Virtualization Infrastructure (NFVI) 1000. NFVI 1000 comprises an example of core network 121 illustrated in FIG. 1 and network circuitry 320 illustrated in FIG. 3, however core network 121 and network circuitry 320 may differ. NFVI 1000 comprises NFVI hardware 1001, NFVI hardware drivers 1002, NFVI operating systems 1003, NFVI virtual layer 1004, and NFVI Virtual Network Functions (VNFs) 1005. NFVI hardware 1001 comprises Network Interface Cards (NICs), CPU, GPU, RAM, Flash/Disk Drives (DRIVE), and Data Switches (SW). NFVI hardware drivers 1002 comprise software that is resident in the NIC, CPU, GPU, RAM, DRIVE, and SW. NFVI operating systems 1003 comprise kernels, modules, applications, containers, hypervisors, and the like. NFVI virtual layer 1004 comprises vNIC, vCPU, vGPU, vRAM, vDRIVE, and vSW. NFVI VNFs 1005 comprise AMF 1021, SMF 1022, UPFs 1023, NWDAF 1024, and ADRF 1025. Additional VNFs and network elements like AUSF, NSSF, PCF, UDM, UDR, NRF, EIR, SCP, NEF, and AF are typically present but are omitted for clarity. NFVI 1000 may be located at a single site or be distributed across multiple geographic locations. The NIC in NFVI hardware 1001 is coupled to RANs 611 and 612, machine learning (ML) system 630, and data network 641. NFVI hardware 1001 executes NFVI hardware drivers 1002, NFVI operating systems 1003, NFVI virtual layer 1004, and NFVI VNFs 1005 to form AMF 621, SMF 622, UPFs 623, NWDAF 624, and ADRF 625.

FIG. 11 further illustrates NFVI 1000 in 5G communication network 600. AMF 621 comprises capabilities for UE access registration, UE connection management, UE mobility management, UE authentication and authorization, and control plane KPI reporting. SMF 622 comprises capabilities for session establishment and management, UPF selection and control, network address allocation, and control plane KPI reporting. UPFs 623 comprise capabilities for packet routing and forwarding, QoS handling and PDU serving, and user plane KPI reporting. NWDAF 624 comprises capabilities for network function (NF) data collection, orchestration and management (OAM) data collection, network data analytics, network KPI filtering and averaging, network KPI correlation, and network KPI tokenization. ADRF 625 comprises capabilities for network analytics data storage, network analytics data retrieval, and tokenized KPI storage.

In some examples, NWDAF 624 transfers subscription requests to AMF 621, SMF 622, UPFs 623, RAN 611, and RAN 612 for KPI reporting. The requests specify the KPIs to be reported to NWDAF 624 and the reporting schedule. For example, the request to RANs 611 and 612 may direct RANs 611 and 612 to report KPIs for average RSRP, average RSRQ, and average SINR every hour while the requests to UPFs 623 may direct UPFs 623 to report KPIs for packet latency once every 24 hours. NWDAF 624 receives control plane KPIs from AMF 621 and SMF 622, user plane KPIs from UPFs 623, and RAN KPIs from RANs 611 and 612 based on the subscriptions. In this example, the intended function of LLM 631 is to create synthetic KPIs that depict control plane conditions in network 600. As such, NWDAF 624 selects the control plane KPIs for authentication success rate, requested PDU session types, requested slice types, security violations, handover requests, and UPF selections reported by AMF 621 and SMF 622. Since LLM 631 is to create synthetic KPIs that depict control plane conditions, NWDAF 624 ignores RAN KPIs and user plane KPIs reported by RAN 611, RAN 612, and UPFs 623.

NWDAF 624 time averages the control plane KPIs (e.g., over a one hour sliding window over a period of one day). NWDAF 624 processes the authentication success rate, requested PDU session types, requested slice types, security violations, handover requests, and UPF selections using a DTW algorithm to determine correlations between the control plane KPIs. NWDAF 624 forms KPI groups based on the identified correlations and sorts the KPI groups based on the context in which they were generated. In this example, NWDAF 624 sorts the KPI groups based on the days of the week that they were generated and based on the network loading conditions when they were generated. For example, NWDAF 624 may cluster KPI groups that were generated on Mondays during heavy loading.

Once sorted, NWDAF 624 tokenizes the KPIs of each KPI group. NWDAF 624 determines the statistical distribution of numeric values that compose the KPIs, selects ranges to bucket the KPIs based on the statistical distributions, and assigns strings to each of the ranges. For example, NWDAF 624 may determine the number of control plane security violations range from 0-100, select the ranges 0-33, 34-66, and 66-100, and assign the strings "LOW", "MEDIUM", and "HIGH" to the three ranges, respectively. NWDAF 624 buckets the control plane KPIs into the ranges and generates a corresponding number of tokenized KPIs based on the strings. For example, a security violation KPI with the value of 50 may correspond to the tokenized KPI CPSVMedium. NWDAF 624 combines the individual KPI tokens for each KPI group to form tokenized KPI groups. For example, a KPI group that comprises authentication success rate and the number of control plane security violations may correspond to the tokenized KPI group CPSVMedium_ASRLow.

NWDAF 624 transfers the tokenized KPI groups organized based on their generation context to ADRF 625. NWDAF 624 indicates KPI context data that includes the string to range mappings, the KPI averages, and the KPI standard deviations to ADRF 625. ADRF 625 creates KPI profiles based on the generation context and stores corresponding ones of the tokenized KPI groups in their respective KPI profiles. For example, a first KPI profile may store KPIs generated on Tuesday during light loading while a second KPI profile may store KPIs generated on Friday during average loading.

Subsequently, LLM 631 retrieves the tokenized KPIs and KPI context from ADRF 625 and trains its constituent machine learning algorithms to produce synthetic KPI streams that depict control plane KPIs. LLM 631 converts the tokenized KPIs into numeric values based on the string to range mappings, the average KPI values, and the standard deviations. For example, an authentication success rate KPI token may comprise ASRGreen. The string to range mappings may indicate Green corresponds to the range 80-100%, the average KPI value for that range may comprise 91%, and the standard deviation for that range may comprise 3%. Based on these factors, LLM 631 may convert the ASRGreen KPI token to a value of 89%. LLM 631 groups the numeric values converted from the KPI tokens into feature vectors to represent each KPI group. LLM 631 ingests the feature vectors and trains its algorithms to generate synthetic control plane KPI streams.

After training is complete, LLM 631 receives a KPI request from a third-party source. The request directs LLM 631 to list 24 hours of control plane KPIs during heavy loading conditions on a Saturday. In response, LLM 631 outputs a synthetic KPI stream comprising authentication success rate KPIs, requested PDU session types KPIs, requested slice types KPIs, security violations KPIs, handover requests KPIs, and UPF selections KPIs that depict control plane conditions during heavy loading on a Saturday.

Figure 12:
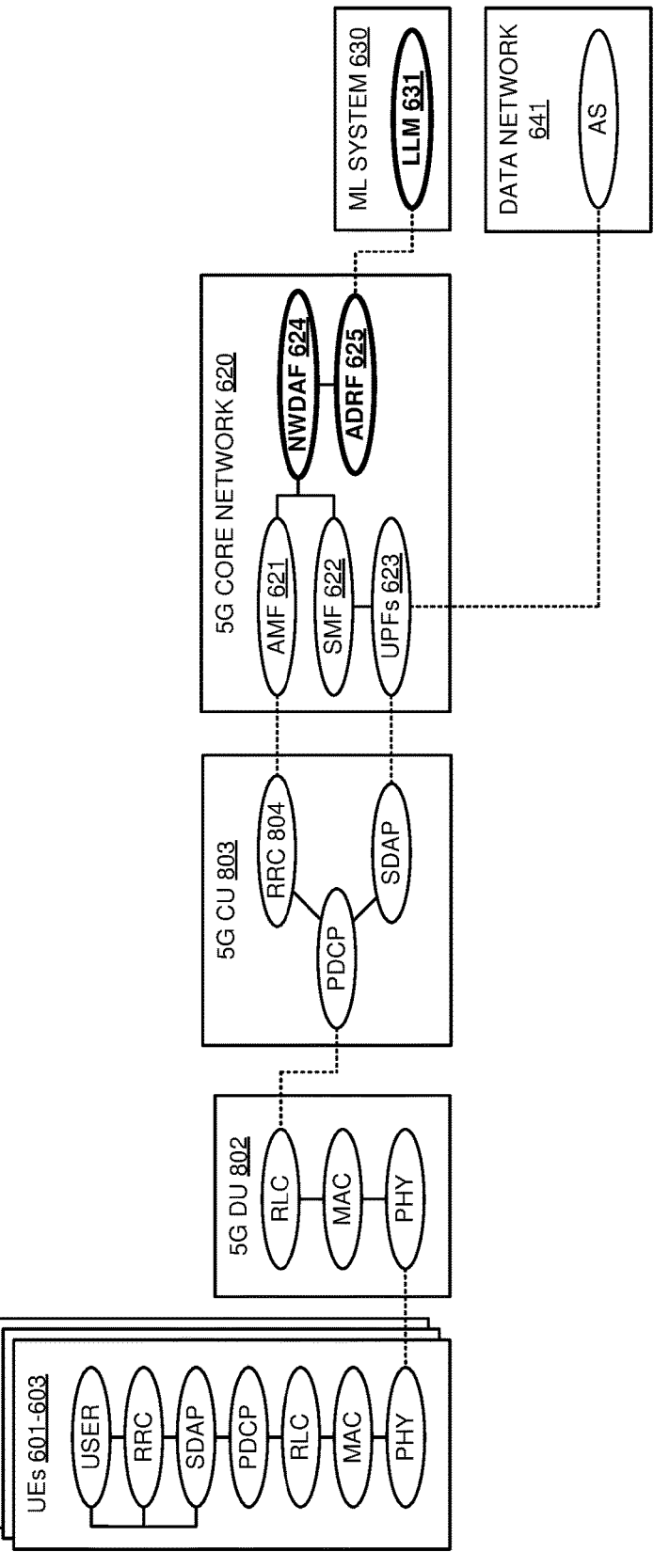
FIG. 12 illustrates an exemplary operation of the 5G communication network to anonymize network KPIs for machine learning training.

FIG. 12 illustrates an exemplary operation of 5G communication network 600 to anonymize network KPIs for machine learning training. The operation may vary in other examples. In some examples, UEs 601-603 wirelessly attach to CU 803 over DU 802 and RU 801. The RRCs in UEs 601-603 implement a RACH procedure with RRC 804 to establish a signaling link over the PDCPs, RLCs, MACs, and PHYs. RRC 804 tracks RACH attachment success rate for UEs 601-603. As UEs 601-603 connect/disconnect from CU 803, RRC 804 tracks the average number of RRC connected users on RAN 611. RRC 804 records the RACH success rate and average number of RRC connected users as RAN KPIs. Once the signaling link is established, the RRCs in UEs 601-603 transfer registration requests to RRC 804 over the PDCPs, RLCs, MACs, and PHYs. RRC 803 forwards the registration request for UE 601 to AMF 621. AMF 621 receives the requests and interfaces with other network functions in core network 620 to authenticate UEs 601-603.

Responsive to the successful authentication, AMF 621 registers UEs 601-603. AMF 621 interacts with other network functions in core network 620 to create context for UEs 601-603. AMF 621 directs SMF 622 to establish the PDU sessions for UEs 601-603 based on the UE context. SMF 622 selects ones of UPFs 623 to establish the PDU sessions for UEs 601-603. SMF 622 informs AMF 621 that the UPFs 623 are ready to support the PDU sessions. In response, AMF 621 transfers registration accept messages for UEs 601-603 to RRC 804. RRC 804 forwards the accept messages to the RRCs in UEs 601-603 over the PDCPs, RLCs, MACs, and PHYs. The RRCs in UEs 601-603 receive the accept messages and responsively direct their respective SDAPs to begin the PDU sessions. The SDAPs in UEs 601-603 wirelessly exchange user data for their PDU sessions with the SDAP in CU 803 over the PDCPs, RLCs, MACs, and PHYs. The SDAP in CU 803 exchanges the user data with UPFs 623. UPFs 623 exchange the user date with the AS in data network 641.

RAN 611 is subscribed to NWDAF 624 for RAN KPI reporting. The subscription instructs RAN 611 to report KPIs for RACH success rate, average number of RRC connected users, average RSRP, average RSRQ, average SINR, downlink traffic volume, average downlink throughput, downlink PRB utilization, total call count, call access failure rate, call drop rate, total dropped calls, and uplink call packet loss rate to NWDAF 624. To generate the radio metric KPIs, RRC 804 transfers measurement commands to the RRCs in UEs 601-603 over the PDCPs, RLCs, MACs, and PHYs. The measurement commands instruct UEs 601-603 to measure RSRQ. RSRP, and SINR. The RRCs in UEs 601-603 instruct their respective PHYs to measure RSRQ. RSRP, and SINR of the pilot signal broadcast by RAN 611.

The respective PHYs sense the pilot signal and report the measured RSRQ. RSRP, and SINR to their RRCs. The RRCs generate measurement reports comprising the measured RSRQ, RSRP, and SINR and transfer the measurement reports to RRC 804 over the PDCPs, RLCs, MACs, and PHYS.

RRC 804 averages the reported measurement statistics to determine average RSRQ, average RSRP, and average SINR. RRC 804 directs the SDAP in CU 803 to measure downlink traffic volume and average downlink throughput for the PDU sessions of UEs 601-603. The SDAP senses the data exchange between UPFs 623 and UEs 601-603 and reports the downlink traffic volume and average downlink throughput to RRC 804. RRC 804 directs the MAC in DU 802 to measure downlink PRB utilization for UEs 601-603. The MAC processes the downlink traffic schedules for UEs 601-603 and reports the PRB utilization to RRC 804. RRC 804 directs SDAP in CU 803 to track voice calls initiated/ received by UEs 601-603. The SDAP tracks the total call count, the call access failure rate, the call drop rate, total dropped calls, and the uplink call packet loss rate. The SDAP reports the voice call metrics to RRC 804. RRC 804 generates a KPI that comprises the RACH success rate, average number of RRC connected users, average RSRP, average RSRQ, average SINR, downlink traffic volume, average downlink throughput, downlink PRB utilization, call count, call failure rate, call drop rate, dropped call count, and uplink call packet loss rate. RRC 804 transfers the KPI report to NWDAF 624 over AMF 621.

NWDAF 624 receives the KPI report transferred by RRC 804. NWDAF 624 may also receive KPI reports from other network entities subscribed to NWDAF 624 like AMF 621, SMF 622, UPFs 623 that include non-RAN KPIs. In this example, the intended function of LLM 631 is to create synthetic RAN KPIs for network operators and third-party entities. As such, NWDAF 624 filters for KPIs reported by RAN 611 while ignoring KPIs reported from non-RAN sources. NWDAF 624 hosts a data structure that implements a DTW algorithm to detect correlations between KPIs. NWDAF 624 inputs the RACH success rate, average number of RRC connected users, average RSRP, average RSRQ, average SINR, downlink traffic volume, average downlink throughput, downlink PRB utilization, call count, call failure rate, call drop rate, dropped call count, and uplink call packet loss rate into the data structure. The data structure generates an output that indicates correlated ones of the RAN KPIs. NWDAF 624 forms KPI groups based on the identified correlations and sorts the KPI groups based on the context in which they were generated. In this example, NWDAF 624 sorts the KPI groups based on the days of the week that they were generated, the frequency range used when they were generated, and whether MIMO was used when they were generated.

Once sorted, NWDAF 624 tokenizes the KPIs of each KPI group. NWDAF 624 selects numeric ranges for each of the RAN KPIs and labels each range with a string. NWDAF 624 buckets the RAN KPIs into the ranges based on their numeric values and generates a corresponding number of tokenized KPIs based on the strings assigned to the ranges. NWDAF 624 forms tokenized KPI groups that correspond to the KPI groups and transfers the tokens to ADRF 625. NWDAF 624 indicates KPI context data that includes the string to range mappings to ADRF 625. ADRF 625 creates KPI profiles based on the generation context and stores the tokens in their appropriate KPI profiles. For example, ADRF 625 may create a KPI profile for KPIs generated by a MIMO cell at 700 MHz on Wednesday and store tokens with this generation context in the KPI profile.

LLM 631 retrieves the tokenized KPIs from ADRF 625. LLM 631 converts the tokenized KPIs into numeric values based on the string to range mappings. For example, an SINR KPI token may comprise SINRRed and the string to range mappings may indicate Red corresponds to the range −5 dB to 5 dB. LLM 631 may randomly select a numeric value within this range (e.g., 4 dB) to convert the SINRRed token to a numeric value. LLM 631 groups the numeric values into feature vectors to represent each KPI group and trains its algorithms to generate synthetic RAN KPI streams based on the feature vectors. Subsequently, LLM 631 receives a KPI request from a third-party source. The request directs LLM 631 to list 24 hours of average RSRP and RSRQ for MIMO RANs operating at 800 MHz on the weekend. In response, LLM 631 outputs a synthetic KPI stream comprising synthetic average RSRP and RSRQ KPIs for a MIMO RAN operating at 800 MHz on the weekend.

The wireless data network circuitry described above comprises computer hardware and software that form special-purpose network circuitry to anonymize network KPIs for machine learning training. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose network circuitry to anonymize network KPIs for machine learning training.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention.

Thus, the invention is not limited to the specific embodiments described above, but only by the following claims and their equivalents.

What is claimed is:

1. A method of operating a wireless communication network to anonymize network Key Performance Indicators (KPIs) to train a machine learning model, the method comprising:

retrieving the network KPIs generated by network KPI sources;

filtering the network KPIs based on an intended function of the machine learning model;

identifying correlated ones of the filtered KPIs and grouping the correlated ones of the filtered KPIs into KPI groups based on at least one network condition;

for each KPI group, sorting the filtered KPIs into KPI ranges;

for each KPI range, tokenizing the KPI range by converting numeric values of the filtered KPIs that compose the KPI range into strings to generate tokenized KPIs; and storing the tokenized KPIs in a KPI database accessible by the machine learning model for training.

2. The method of claim 1 wherein retrieving the network KPIs generated by the network KPI sources comprises retrieving the network KPIs from Radio Access Networks (RANs), control plane network functions, and user plane network functions.

3. The method of claim 1 wherein:

the intended function of the machine learning model is to generate synthetic KPI streams comprising a set of synthetic KPIs; and filtering the network KPIs based on the intended function of the machine learning model comprises selecting the network KPIs that correspond to the set of synthetic KPIs.

4. The method of claim 1 wherein identifying the correlated ones of the filtered KPIs comprises processing each of the filtered KPIs using a Dynamic Time Warping (DTW) algorithm to measure similarities between each of the filtered KPIs.

5. The method of claim 1 wherein:

the at least one network condition comprises one or more of a Radio Access Network (RAN) configuration, a Radio Access Technology (RAT) type, a network loading condition, a geographic location type, a network behavior, or a time period; and grouping the correlated ones of the filtered KPIs into the KPI groups based on at least one network condition comprises grouping the correlated ones of the filtered KPIs into the KPI groups based on at least one of the RAN configuration, the RAT type, the network loading condition, the geographic location type, the network behavior, or the time period.

6. The method of claim 1 wherein sorting the filtered KPIs into the KPI ranges comprises:

determining a numeric distribution of the numeric values of the filtered KPIs, selecting a range size for the filtered KPIs based on the numeric distribution;

selecting the KPI ranges based on the range size; and grouping ones of the filtered KPIs based on the KPI ranges.

7. The method of claim 1 wherein tokenizing the KPI range by converting the numeric values of the filtered KPIs that compose the KPI range into the strings to generate the tokenized KPIs comprises:

determining an amount of the filtered KPIs that compose the KPI range;

selecting a word to represent the KPI range; and generating the tokenized KPIs by replacing the numeric values of the filtered KPIs in the KPI range with the word.

8. The method of claim 1 wherein:

the machine learning model comprises a Large Language Model (LLM); and further comprising:

retrieving the tokenized KPIs from the KPI database and training the LLM using the tokenized KPIs to generate synthetic KPI streams comprising a set of synthetic KPIs.

9. The method of claim 1 wherein the network KPIs comprise one or more of downlink traffic volume, call count, average downlink throughput, access failure rate, call drop rate, call drop count, Physical Resource Block (PRB) utilization, average number of Radio Resource Control (RRC) connected users, packet loss rate, average Received Signal Received Quality (RSRQ), average Received Signal Received Power (RSRP), Random Access Channel (RACH) success rate, or average Singal-to-Interference plus Noise Ratio (SINR).

10. A wireless communication network to anonymize network Key Performance Indicators (KPIs) to train a machine learning model, the wireless communication network comprising:

a network analytics system configured to:

retrieve the network KPIs generated by network KPI sources;

filter the network KPIs based on an intended function of the machine learning model;

identify correlated ones of the filtered KPIs and group the correlated ones of the filtered KPIs into KPI groups based on at least one network condition;

for each KPI group, sort the filtered KPIs into KPI ranges; and for each KPI range, tokenize the KPI range by converting numeric values of the filtered KPIs that compose the KPI range into strings to generate tokenized KPIs; and a KPI store configured to:

store the tokenized KPIs in a KPI database accessible by the machine learning model for training.

11. The wireless communication network of claim 10 wherein the network analytics system is configured to retrieve the network KPIs from Radio Access Networks (RANs), control plane network functions, and user plane network functions to retrieve the network KPIs generated by the network KPI sources.

12. The wireless communication network of claim 10 wherein:

the intended function of the machine learning model is to generate synthetic KPI streams comprising a set of synthetic KPIs; and the network analytics system is configured to select the network KPIs that correspond to the set of synthetic KPIs to filter the network KPIs.

13. The wireless communication network of claim 10 wherein the network analytics system is configured to process each of the filtered KPIs using a Dynamic Time Warping (DTW) algorithm to measure similarities between each of the filtered KPIs to identify the correlated ones of the filtered KPIs.

14. The wireless communication network of claim 10 wherein:

the at least one network condition comprises one or more of a Radio Access Network (RAN) configuration, a Radio Access Technology (RAT) type, a network loading condition, a geographic location type, a network behavior, or a time period; and the network analytics system is configured to group the correlated ones of the filtered KPIs into the KPI groups based on at least one of the RAN configuration, the RAT type, the network loading condition, the geographic location type, the network behavior, or the time period.

15. The wireless communication network of claim 10 wherein the network analytics system is further configured to:

determine a numeric distribution of the numeric values of the filtered KPIs, select a range size for the filtered KPIs based on the numeric distribution;

select the KPI ranges based on the range size; and group ones of the filtered KPIs based on the KPI ranges to sort the filtered KPIs into the KPI ranges.

16. The wireless communication network of claim 10 wherein the network analytics system is further configured to:

determine an amount of the filtered KPIs that compose the KPI range;

select a word to represent the KPI range; and generate the tokenized KPIs by replacing the numeric values of the filtered KPIs in the KPI range with the word.

17. The wireless communication network of claim 10 wherein:

the machine learning model comprises a Large Language Model (LLM); and the LLM is configured to retrieve the tokenized KPIs from the KPI database and train its constituent machine learning algorithms using the tokenized KPIs to generate synthetic KPI streams comprising a set of synthetic KPIs.

18. The wireless communication network of claim 10 wherein the network KPIs comprise one or more of downlink traffic volume, call count, average downlink throughput, access failure rate, call drop rate, call drop count, Physical Resource Block (PRB) utilization, average number of Radio Resource Control (RRC) connected users, packet loss rate, average Received Signal Received Quality (RSRQ), average Received Signal Received Power (RSRP), Random Access Channel (RACH) success rate, or average Singal-to-Interference plus Noise Ratio (SINR).

19. A wireless communication network to anonymize network Key Performance Indicators (KPIs) to train a machine learning model, the wireless communication network comprising:

a Network Data Analytics Function (NWDAF) configured to:

retrieve the network KPIs generated by network KPI sources;

filter the network KPIs based on an intended function of the machine learning model;

identify correlated ones of the filtered KPIs and group the correlated ones of the filtered KPIs into KPI groups based on at least one network condition;

for each KPI group, sort the filtered KPIs into KPI ranges;

for each KPI range, tokenize the KPI range by con-
verting numeric values of the filtered KPIs that
compose the KPI range into strings to generate
tokenized KPIs; and an Analytics Data Repository Function (ADRF) config-
ured to:

store the tokenized KPIs in a KPI database accessible
by the machine learning model for training.

20. The wireless communication network of claim 19
wherein the network KPIs comprise one or more of down-
link traffic volume, call count, average downlink throughput,
access failure rate, call drop rate, call drop count, Physical
Resource Block (PRB) utilization, Radio Resource Control
(RRC) connected users count, packet loss rate, average
Received Signal Received Quality (RSRQ), average
Received Signal Received Power (RSRP), Random Access
Channel (RACH) success rate, or average Singal-to-Inter-
ference plus Noise Ratio (SINR).

* * * * *